(12) United States Patent
Takemoto et al.

(10) Patent No.: US 9,584,060 B2
(45) Date of Patent: Feb. 28, 2017

(54) MOTOR, METHOD FOR DRIVING MOTOR, AND DRIVE CONTROLLER FOR MOTOR

(71) Applicant: ASMO CO., LTD., Shizuoka-ken (JP)

(72) Inventors: Yoshiaki Takemoto, Toyohashi (JP); Yoko Tateishi, Kosai (JP); Seiya Yokoyama, Toyohashi (JP); Yusuke Morimoto, Takayama (JP)

(73) Assignee: ASMO CO., LTD., Shizuoka-ken (JP)

( * ) Notice: Subject to any disclaimer, the term of this patent is extended or adjusted under 35 U.S.C. 154(b) by 0 days.

(21) Appl. No.: 14/881,726

(22) Filed: Oct. 13, 2015

(65) Prior Publication Data

US 2016/0111930 A1   Apr. 21, 2016

(30) Foreign Application Priority Data

Oct. 20, 2014 (JP) .................................. 2014-213672
Oct. 20, 2014 (JP) .................................. 2014-213673

(51) Int. Cl.
*H02K 3/28* (2006.01)
*H02P 29/00* (2016.01)
*H02K 21/14* (2006.01)
*H02K 1/27* (2006.01)
*H02K 1/14* (2006.01)

(52) U.S. Cl.
CPC ............. *H02P 29/00* (2013.01); *H02K 1/2713* (2013.01); *H02K 21/145* (2013.01); *H02K 1/145* (2013.01)

(58) Field of Classification Search
CPC ........................................................ H02K 3/28
USPC .................................................. 318/504, 494
See application file for complete search history.

(56) References Cited

U.S. PATENT DOCUMENTS 7,239,065 B2 * 7/2007 Horst ..................... H02N 1/004
                                                        310/309

FOREIGN PATENT DOCUMENTS

JP          2005192384 A        7/2005

* cited by examiner

*Primary Examiner* — David S Luo
(74) *Attorney, Agent, or Firm* — Patterson Thuente Pedersen, P.A.

(57) ABSTRACT

A motor includes a two-layer rotor and a two-layer stator. The two layer rotor includes an A-phase rotor and a B-phase rotor that are stacked together. When θ1 represents, in electric angle, an angle of the B-phase stator relative to the A-phase stator in a clockwise circumferential direction, and θ2 represents, in electric angle, an angle of the B-phase rotor relative to the A-phase rotor in a counterclockwise circumferential direction, θ1+|θ2|=90° is satisfied.

16 Claims, 18 Drawing Sheets

Fig.17
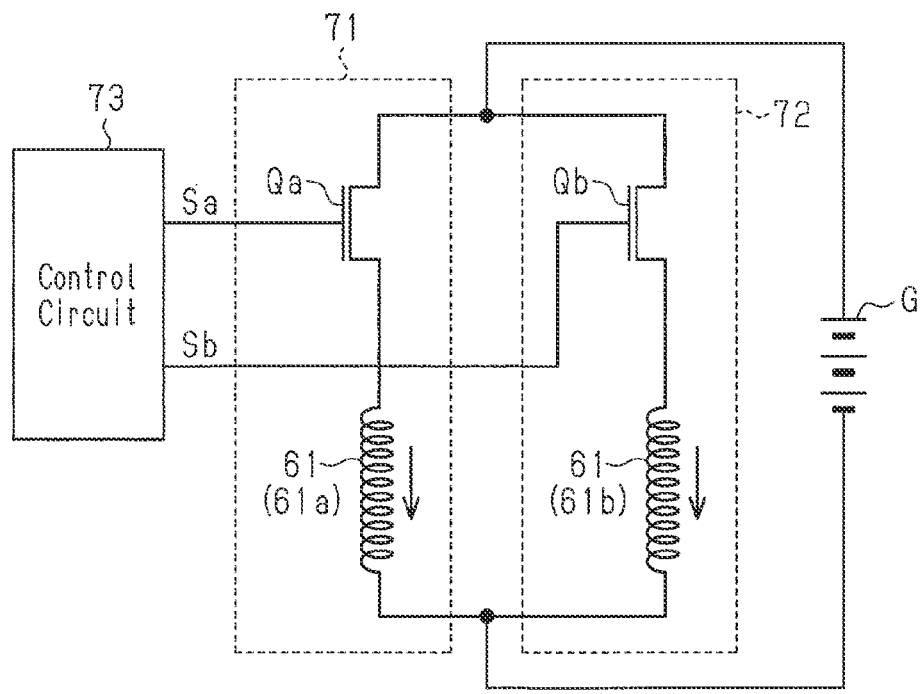
Fig.18
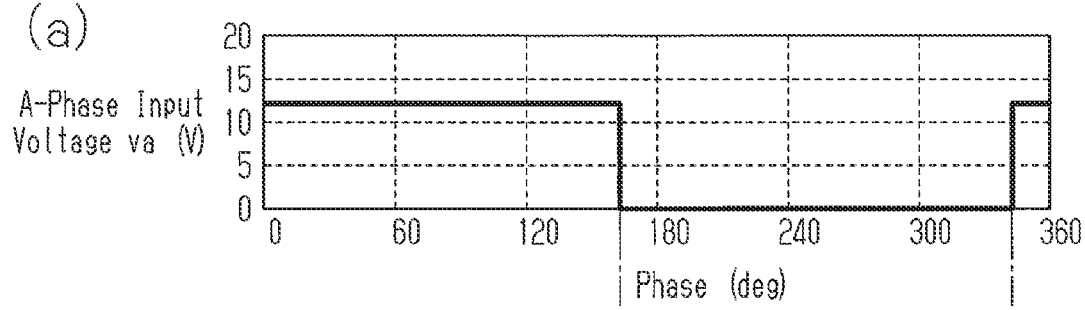
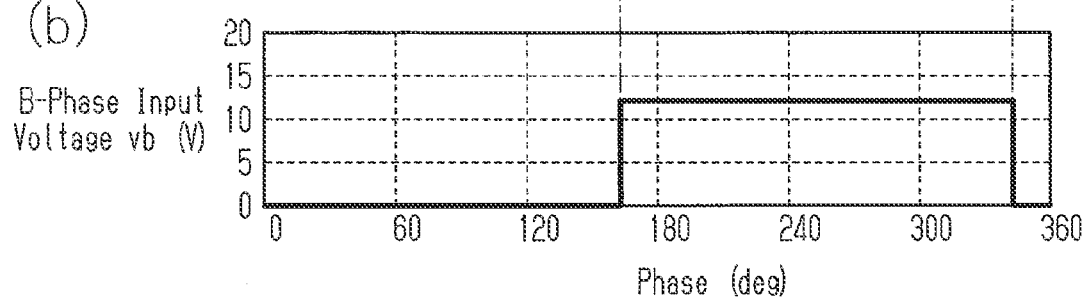

US 9,584,060 B2

MOTOR, METHOD FOR DRIVING MOTOR, AND DRIVE CONTROLLER FOR MOTOR

RELATED APPLICATIONS

This present application claims priority to Japanese Patent Application No. 2014-213672, filed Oct. 20, 2014 and Japanese Patent Application No. 2014-213673, filed Oct. 20, 2014, said applications being fully incorporated herein by reference in their entirety.

FIELD OF THE INVENTION

The present invention relates to a motor, a method for driving the motor, and a drive controller for a motor.

BACKGROUND OF THE INVENTION

Japanese Laid-Open Patent Publication No. 2005-192384 describes an example of a brushless motor that is an outer rotor type motor including a surface permanent motor (SPM) rotor and a Lundell-type stator. The SPM rotor includes a rotor core and permanent magnets attached to the surface of the rotor core. The Lundell-type stator includes two stator core bases and windings arranged between the stator core bases. Each stator core base includes claw poles arranged at equal intervals in the circumferential direction. In such a brushless motor, two types of windings are stacked in the axial direction. Power from a first system and power from a second system are applied to the two types of windings, respectively.

The brushless motor is a two-phase motor in which the Lundell-type stator is configured by a two-layer structure including winding for the first system and winding for the second system. However, a two-phase motor includes a dead point that adversely affects the starting characteristics of the motor.

A multi-Lundell-type motor includes a Lundell-type rotor and a Lundell-type stator. The Lundell-type rotor includes two rotor cores and a field magnet arranged between the rotor cores. Each rotor core includes claw poles arranged in the circumferential direction. The Lundell-type stator includes two stator cores and windings arranged between the stator cores. Each stator core includes claw poles arranged in the circumferential direction. The problem described above also occurs when the multi-Lundell-type motor has a two-layer two-phase tandem arrangement.

In the two-layer two-phase multi-Lundell-type motor, leakage magnetic flux from gaps between adjacent claw poles may lower the effective magnetic flux. In this case, high torque cannot be obtained with the motor.

SUMMARY OF THE INVENTION

It is an object of the present invention to provide a motor that is free from dead points, has superior starting characteristics, and obtains high torque. It is also an object of the present invention to provide a method for driving the motor and a drive controller for the motor.

To achieve the above object, one aspect of the present invention is a motor including with a two-layer rotor and a two-layer stator. The two-layer rotor includes an A-phase rotor and a B-phase rotor that are stacked together. The A-phase rotor includes two A-phase rotor core bases and a field magnet arranged between the A-phase rotor core bases, and each of the A-phase rotor core bases includes claw poles arranged at equal intervals in a circumferential direction. The B-phase rotor includes two B-phase rotor core bases and a field magnet arranged between the B-phase rotor core bases, and each of the B-phase rotor core bases includes claw poles arranged at equal intervals in a circumferential direction. A two-layer stator includes an A-phase stator and a B-phase stator that are stacked together. The A-phase stator includes two A-phase stator core bases and an A-phase winding arranged between the A-phase stator core bases, and each of the A-phase stator core bases includes claw poles arranged at equal intervals in a circumferential direction. The B-phase stator includes two B-phase stator core bases and a B-phase winding arranged between the B-phase stator core bases. Each of the B-phase stator core bases includes claw poles arranged at equal intervals in a circumferential direction. Here, $\theta1+|\theta2|=90°$ is satisfied, where $\theta1$ represents, in electric angle, an angle of the B-phase stator relative to the A-phase stator in a clockwise circumferential direction, and $\theta2$ represents, in electric angle, an angle of the B-phase rotor relative to the A-phase rotor in a counter-clockwise circumferential direction.

A second aspect of the present invention is a method for driving a motor. The method includes applying power to the A-phase winding and the B-phase winding in different phases. The motor includes a two-layer rotor and a two-layer stator. The two-layer rotor includes an A-phase rotor and a B-phase rotor that are stacked together. The A-phase rotor includes two A-phase rotor core bases and a field magnet arranged between the A-phase rotor core bases, and each of the A-phase rotor core bases includes claw poles arranged at equal intervals in a circumferential direction. The B-phase rotor includes two B-phase rotor core bases and a field magnet arranged between the B-phase rotor core bases, and each of the B-phase rotor core bases includes claw poles arranged at equal intervals in a circumferential direction. The two-layer stator includes an A-phase stator and a B-phase stator that are stacked together. The A-phase stator includes two A-phase stator core bases and an A-phase winding arranged between the A-phase stator core bases. Each of the A-phase stator core bases includes claw poles arranged at equal intervals in a circumferential direction. The B-phase stator includes two B-phase stator core bases and a B-phase winding arranged between the B-phase stator core bases, and each of the B-phase stator core bases includes claw poles arranged at equal intervals in a circumferential direction.

A third aspect of the present invention is method for driving a motor. The method includes applying power to two first system annular windings and two second system annular windings in different phases. The motor includes a two-layer rotor and a two-layer stator. The two-layer rotor includes an A-phase rotor and a B-phase rotor that are stacked together. The A-phase rotor includes two A-phase rotor core bases and a field magnet arranged between the A-phase rotor core bases, and each of the A-phase rotor core bases includes claw poles arranged at equal intervals in a circumferential direction. The B-phase rotor includes two B-phase rotor core bases and a field magnet arranged between the B-phase rotor core bases, and each of the B-phase rotor core bases includes claw poles arranged at equal intervals in a circumferential direction. The two-layer stator includes an A-phase stator and a B-phase stator that are stacked together. The A-phase stator includes two A-phase stator core bases and an A-phase winding arranged between the A-phase stator core bases, and each of the A-phase stator core bases includes claw poles arranged at equal intervals in a circumferential direction. The B-phase stator includes two B-phase stator core bases and a B-phase winding arranged between the B-phase stator core bases, and each of the B-phase stator core bases includes claw poles arranged at equal intervals in a circumferential direction. The A-phase winding is wound around the A-phase stator. The A-phase winding includes a first system annular winding and a second system annular winding. The B-phase winding is wound around the B-phase stator. The B-phase winding includes a first system annular winding and a second system annular winding.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 17 is a drive control circuit diagram of a motor in a third embodiment;

FIG. 18 is a waveform chart showing an A-phase input voltage supplied to an A-phase motor and a B-phase input voltage supplied to a B-phase motor;

DETAILED DESCRIPTION OF THE DRAWINGS

First Embodiment

A first embodiment of a motor will now be described with reference to FIGS. 1 to 10. In the description hereafter, a rotation shaft 1 serves as a frame of reference for the axial direction, the circumferential direction, and the radial direction.

Figure 1:
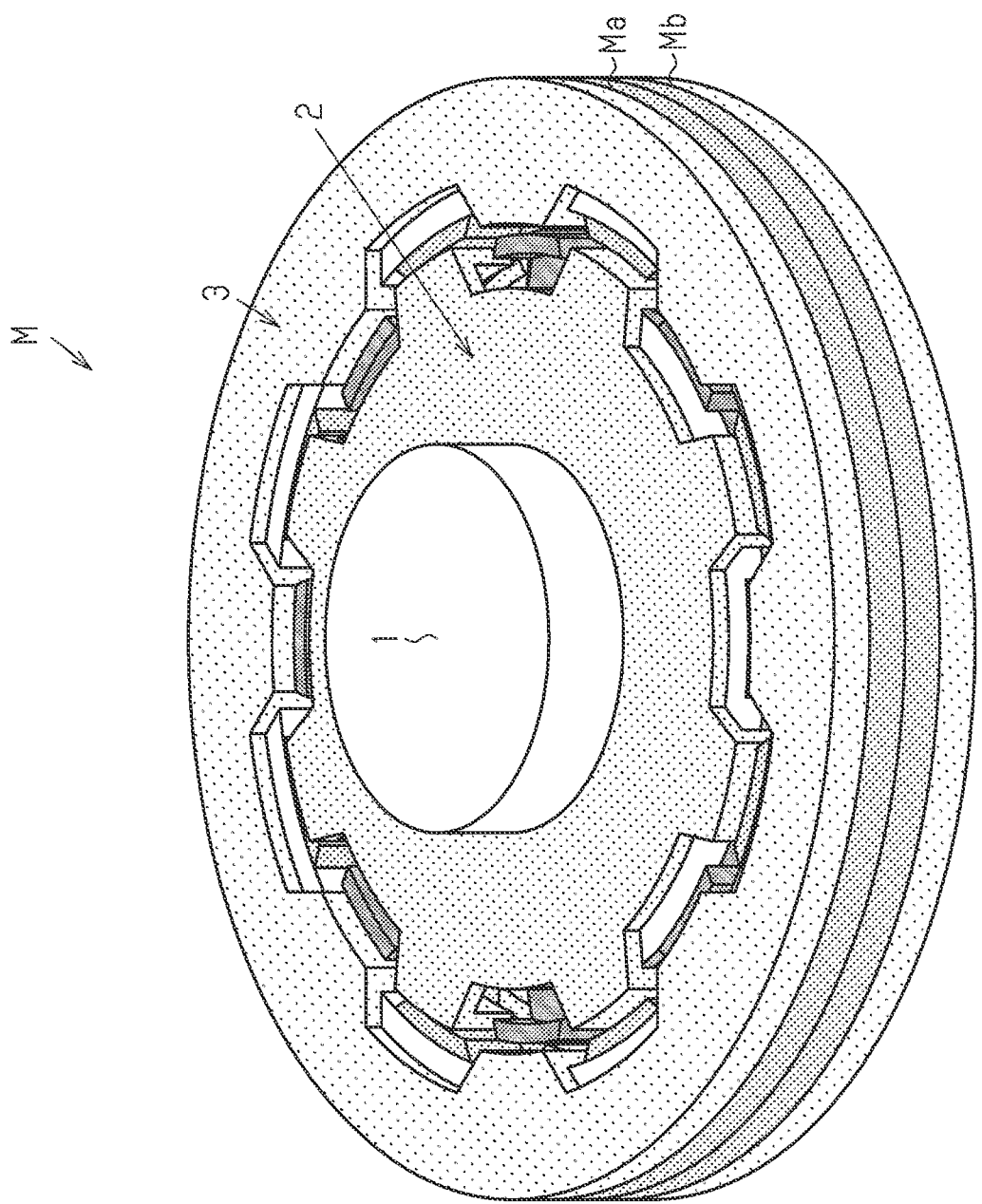
FIG. 1 is a perspective view showing a first embodiment of a motor.

FIG. 1 is a perspective view entirely showing a motor M in the present embodiment. A rotor 2 (two-layer rotor) is fixed to the rotation shaft 1. A stator 3 (two-layer stator) fixed to a motor housing (not shown) is arranged on at the radially outer side of the rotor 2.

Figure 4:
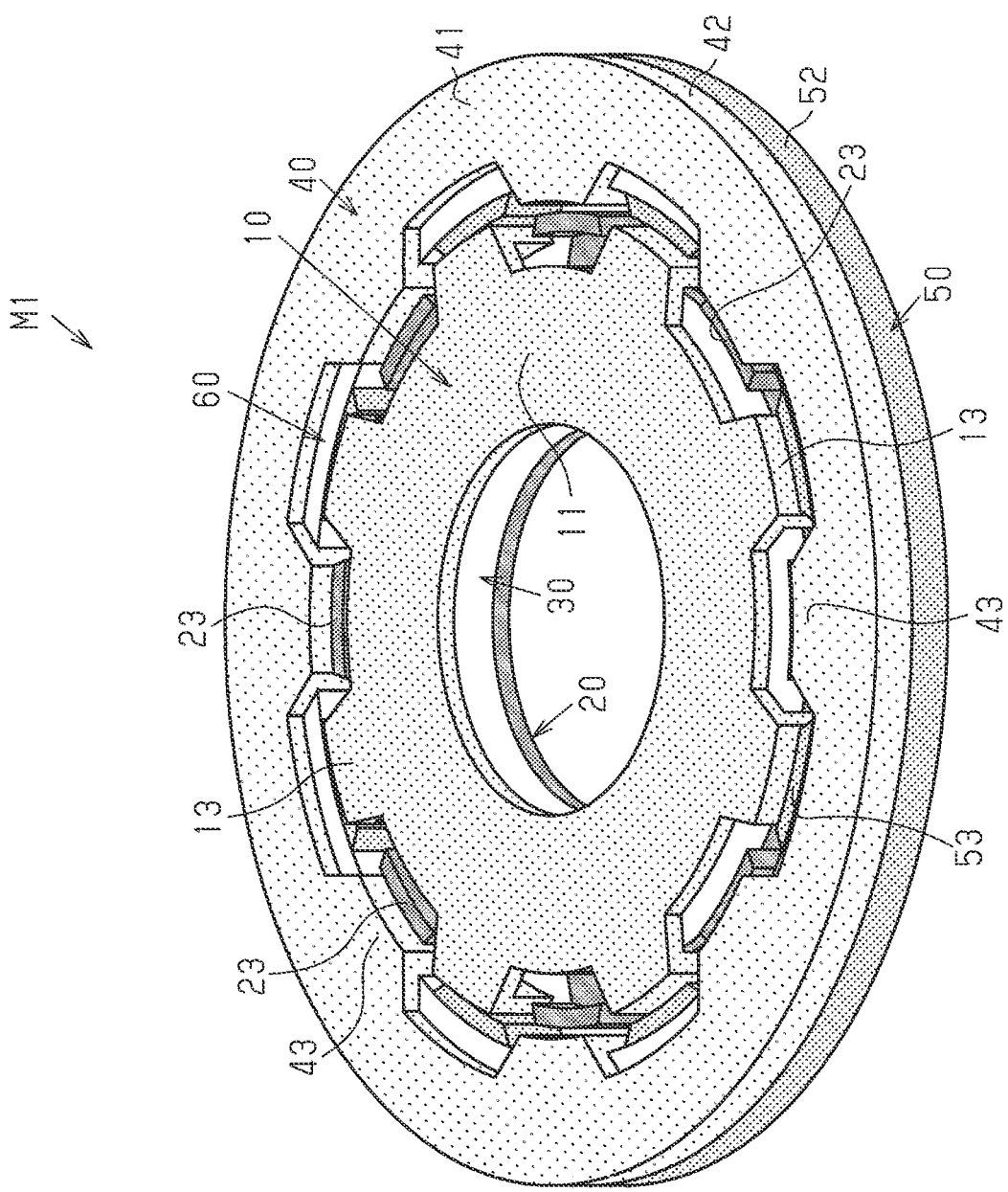
FIG. 4 is a perspective view of a single motor shown in FIG. 1.

As shown in FIG. 1, the motor M is a two-layer, two-phase multi-Lundell-type motor including a multi-Lundell-type A-phase motor Ma and a multi-Lundell-type B-phase motor Mb. The A-phase motor Ma and the B-phase motor Mb are stacked from the top in the described order. Referring to FIG. 4, the A-phase motor Ma and the B-phase motor Mb each include a multi-Lundell-type single motor Ml.

Rotor 2

Figure 2:
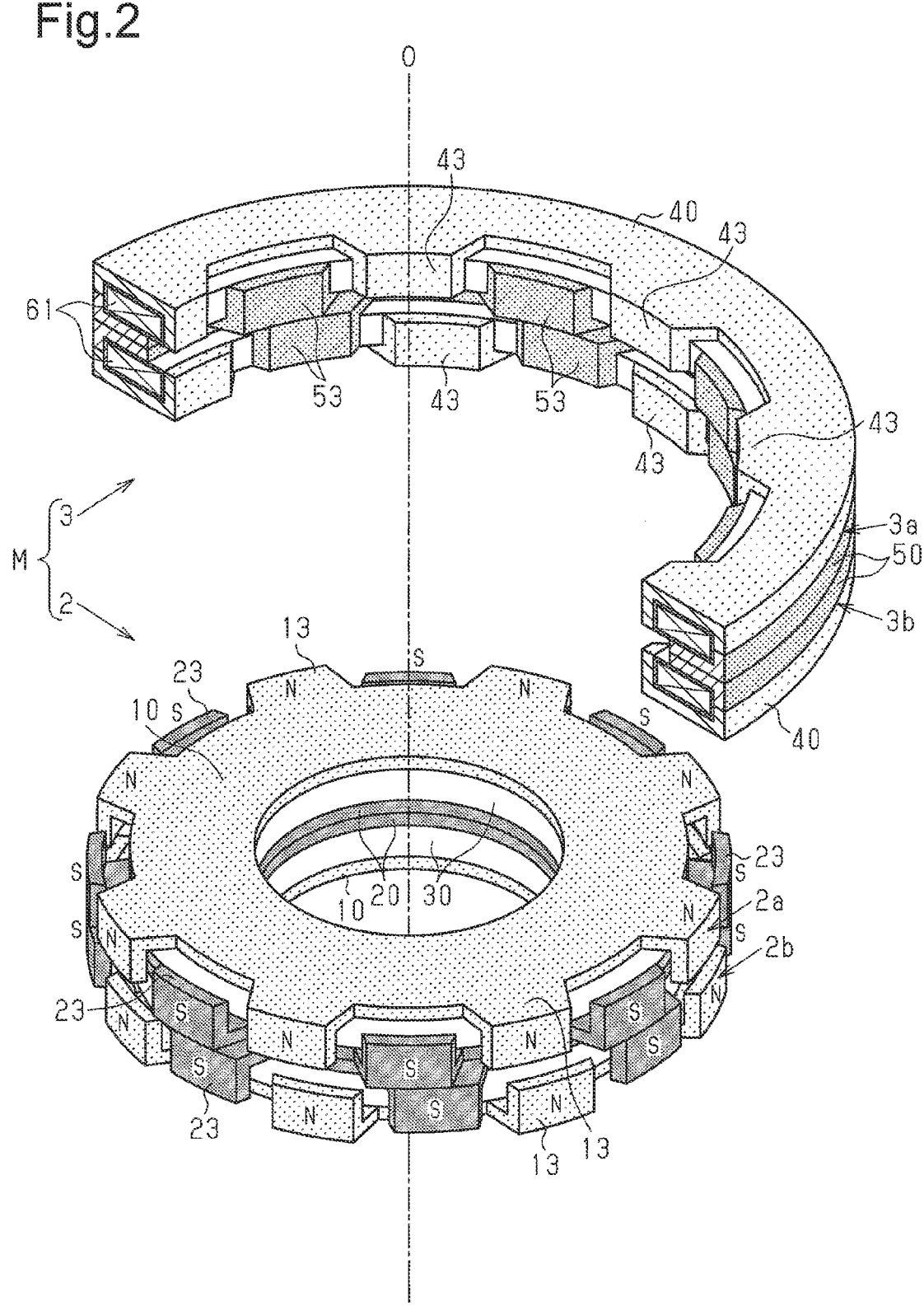
FIG. 2 is an exploded perspective view of the motor shown in FIG. 1 in which a stator is partially cut.
Figure 6:
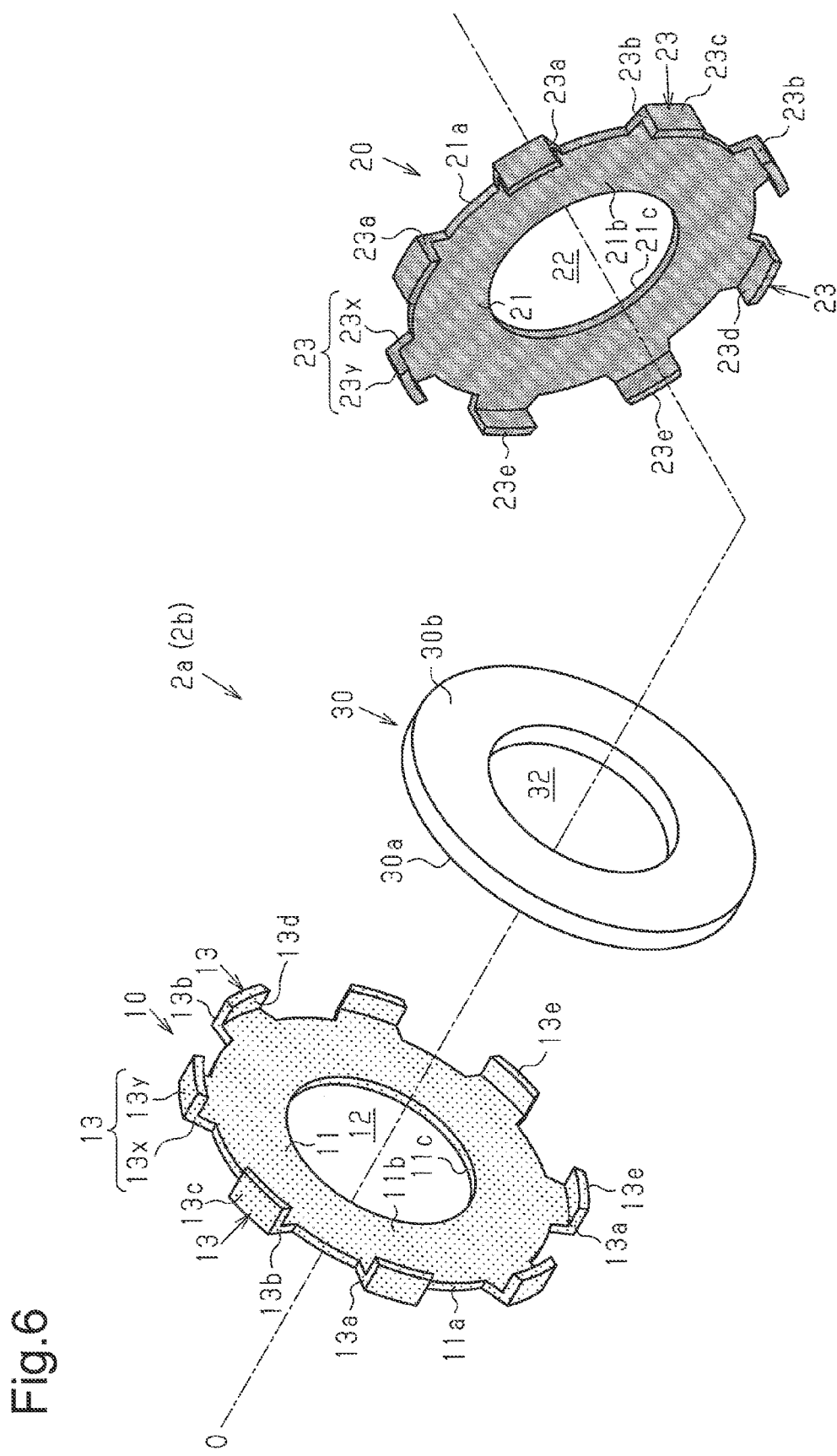
FIG. 6 is an exploded perspective view of a rotor configuring the single motor shown in FIG. 5.

As shown in FIG. 2, the rotor 2 of the motor M has a two-layer two-phase structure including an A-phase rotor 2a and a B-phase rotor 2b, each having a Lundell-type structure. The A-phase rotor 2a and the B-phase rotor 2b are stacked. The A-phase rotor 2a and the B-phase rotor 2b have the same configuration. As shown in FIG. 6, the A-phase rotor 2a and the B-phase rotor 2b each include a first rotor core 10, a second rotor core 20, and a field magnet 30.

First Rotor Core 10

As shown in FIG. 6, the first rotor core 10 includes a first rotor core base 11 formed by an annular electromagnetic steel plate. A through hole 12 extends through a central position of the first rotor core base 11. The rotation shaft 1, which extends through the through hole 12, is fixed to the first rotor core base 11. The first rotor core base 11 includes an outer circumferential surface 11a, an opposing surface 11b, and a non-opposing surface 11c. Eight first rotor claw poles 13, which are identically shaped, are arranged at equal intervals on the outer circumferential surface 11a.

Each first rotor claw pole 13 includes a first rotor basal portion 13x and a first rotor pole portion 13y. The first rotor basal portion 13x projects toward the radially outer side from the outer circumferential surface 11a of the first rotor core base 11. The first rotor pole portion 13y is located at a distal end of the first rotor basal portion 13x. The first rotor pole portion 13y is bent from the first rotor basal portion 13x and extended in the axial direction toward the second rotor core 20. The first rotor basal portion 13x is trapezoidal and has a width that decreases toward the radially outer side as viewed in the axial direction. The first rotor pole portion 13y is tetragonal as viewed in the radial direction. Circumferential end surfaces 13a, 13b of the first rotor claw pole 13, which include the first rotor basal portion 13x and the first rotor pole portion 13y, are both flat.

The first rotor pole portion 13y has a sectoral cross-section in a direction orthogonal to the axial direction. The first rotor pole portion 13y includes a radially outer surface 13c and a radially inner surface 13d. Each of the radially outer surface 13c and the radially inner surface 13d is arcuate and lies along a circle that is concentric with the outer circumferential surface 11a of the first rotor core base 11 as viewed in the axial direction.

The circumferential angle of each first rotor basal portion 13x, that is, the angle between the basal ends of the circumferential end surfaces 13a, 13b from the center axis O of the rotation shaft 1 is smaller than the angle of the gap between adjacent first rotor claw poles 13.

Second Rotor Core 20

Referring to FIG. 6, the second rotor core 20 is formed from the same material as the first rotor core 10 and shaped identically to the first rotor core 10. The second rotor core 20 includes an annular second rotor core base 21. A through hole 22 extends through a central position of the second rotor core base 21. The rotation shaft 1, which extends through the through hole 22, is fixed to the second rotor core base 21. The second rotor 21 includes an outer circumferential surface 21a, an opposing surface 21b, and a non-opposing surface 21c. Eight second rotor claw poles 23 are arranged at equal intervals on the outer circumferential surface 21a.

Each second rotor claw pole 23 includes a second rotor basal portion 23x and a second rotor pole portion 23y. The second rotor basal portion 23x projects toward the radially outer side from the outer circumferential surface 21a of the second rotor core base 21. The second rotor pole portion 23y is located at a distal end of the second rotor basal portion 23x. The second rotor pole portion 23y is bent from the second rotor basal portion 23x and extended in the axial direction toward the first rotor core 10. The second rotor basal portion 23x is trapezoidal and has a width that decreases toward the radially outer side as viewed in the axial direction. The second rotor pole portion 23y is tetragonal as viewed in the radial direction. Circumferential end surfaces 23a, 23b of the second rotor claw pole 23, which includes the second rotor basal portion 23x and the second rotor pole portion 23y, are both flat.

The second rotor pole portion 23y has a sectoral cross-section in a direction orthogonal to the axial direction. The second rotor pole portion 23y includes a radially outer surface 23c and a radially inner surface 23d. Each of the radially outer surface 23c and the radially inner surface 23d is arcuate and lies along a circle that is concentric with the outer circumferential surface 21a of the second rotor core base 21 as viewed in the axial direction.

The circumferential angle of each second rotor basal portion 23x, that is, the angle between the basal ends of the circumferential end surfaces 23a, 23b from the center axis O is smaller than the angle of the gap between adjacent second rotor claw poles 23.

The second rotor core 20 is coupled to the first rotor core 10 so that the field magnet 30 is arranged between the first rotor core 10 and the second rotor core 20 in the axial directions. The second rotor claw poles 23 are located between the first rotor claw poles 13 as viewed in the axial direction.

Field Magnet 30

In the present embodiment, the field magnet 30 is an annular permanent magnet formed by a ferrite sintered magnet. As shown in FIG. 6, a through hole 32 extends through the central position of the field magnet 30. The rotation shaft 1 extends through the through hole 32. One surface 30a of the field magnet 30 contacts the opposing surface 11b of the first rotor core base 11, and the other surface 30b of the field magnet 30 contacts the opposing surface 21b of the second rotor core base 21. The field magnet 30 is held and fixed between the first rotor core 10 and the second rotor core 20 in the axial direction.

Figure 5:
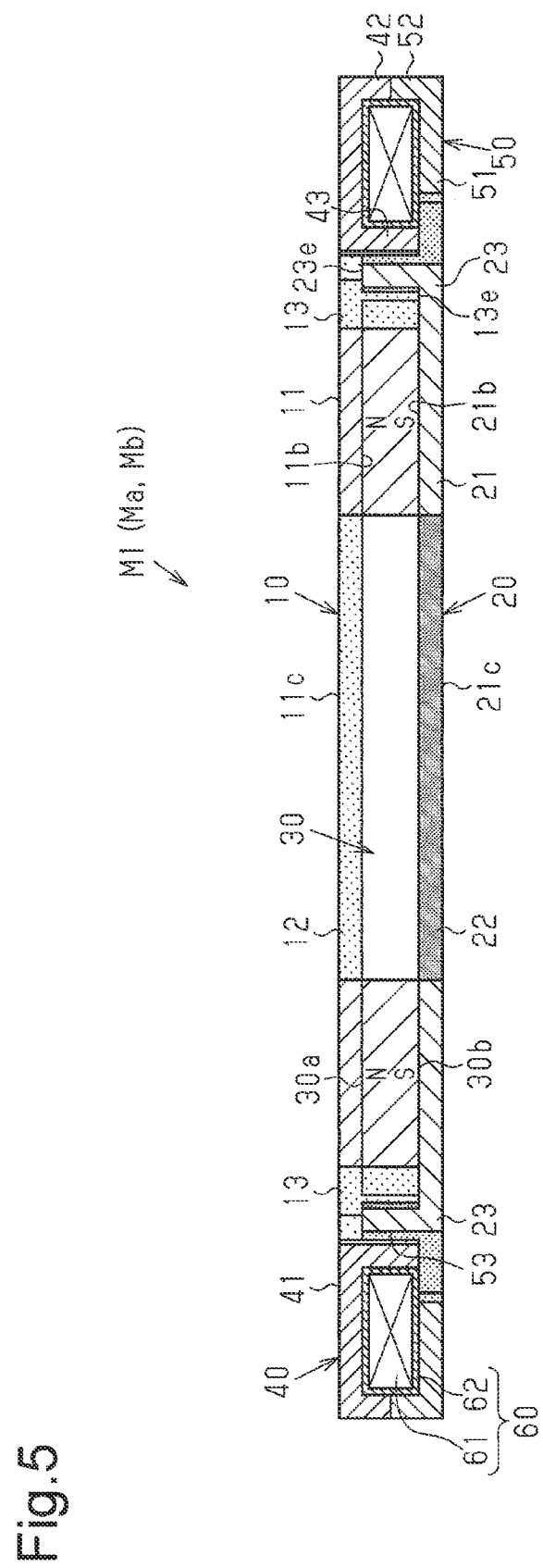
FIG. 5 is a cross-sectional view of the single motor of FIG. 4 as viewed from the radial direction.

The outer diameter of the field magnet 30 is the same as the outer diameters of the first and second rotor core bases 11, 21. The field magnet 30 has a predetermined thickness. As shown in FIG. 5, a distal end surface 13e of each first rotor claw pole 13 is flush with the opposing surface 21b of the second rotor core base 21. A distal end surface 23e of each second rotor claw pole 23 is flush with the opposing surface 11b of the first rotor core base 11.

Referring to FIG. 5, the field magnet 30 is magnetized in the axial direction such that the first rotor core 10 functions as an N pole and the second rotor core 20 functions as an S pole. Therefore, each first rotor claw pole 13 functions as the N pole and each second rotor claw pole 23 functions as the S pole due to the field magnet 30.

In this manner, the A-phase rotor 2a and the B-phase rotor 2b each include the first and second rotor cores 10, 20 and the field magnet 30. Each of the A-phase rotor 2a and the B-phase rotor 2b is a rotor having a Lundell-type structure that uses the field magnet 30. The A-phase rotor 2a and the B-phase rotor 2b each include the first rotor claw poles 13, which function as the N pole, and the second rotor claw poles 23, which function as the S pole. The first rotor claw poles 13 and the second rotor claw poles 23 are alternately arranged in the circumferential direction. The A-phase rotor 2a and the B-phase rotor 2b each have sixteen magnetic poles (eight pairs of poles).

Figure 3:
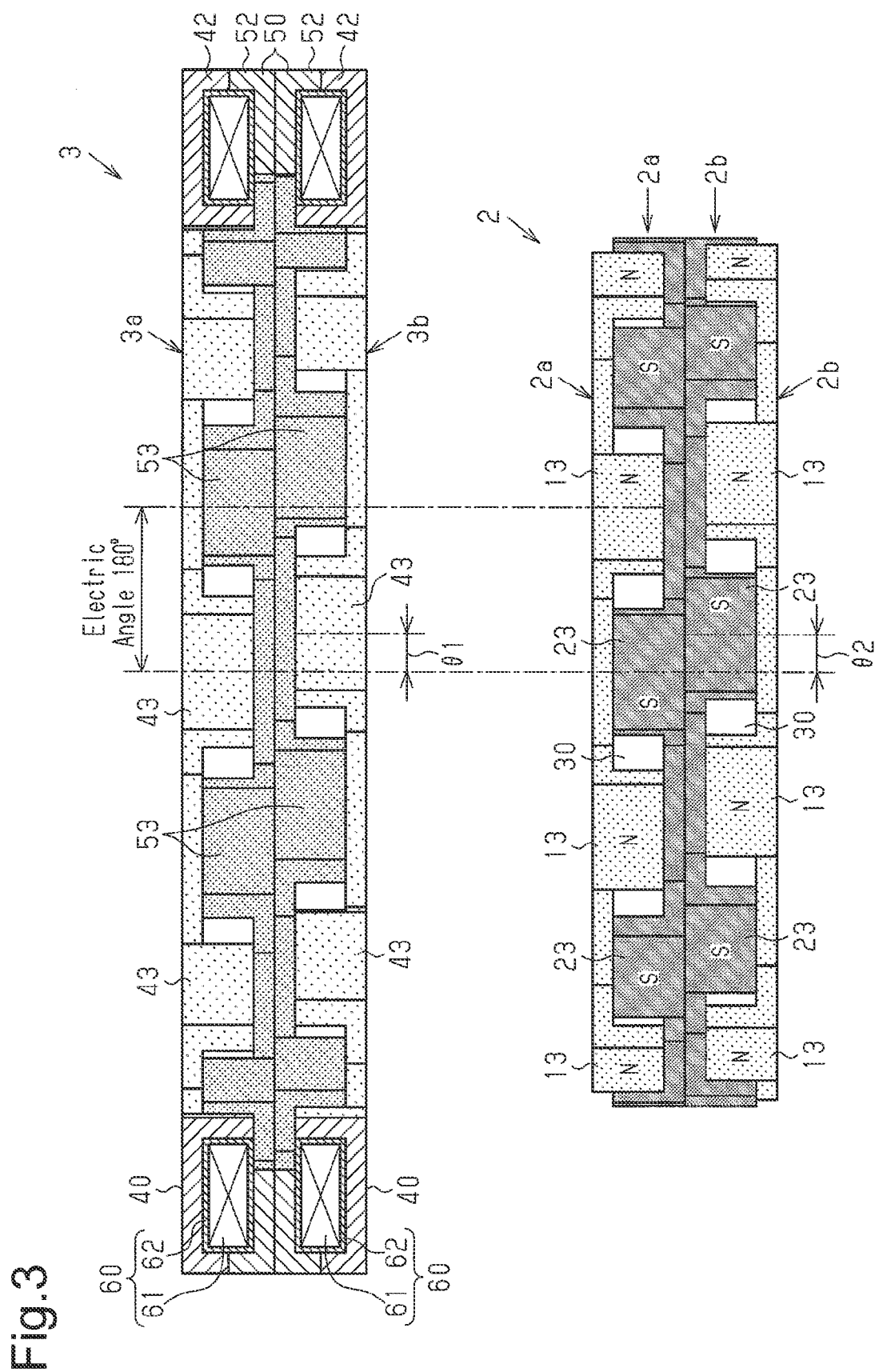
FIG. 3 is an exploded front view of the motor shown in FIG. 1 as viewed from the radial direction in which the stator is partially cut.

As shown in FIGS. 2 and 3, the A-phase rotor 2a and the B-phase rotor 2b are stacked in the axial direction to form the two-layer two-phase Lundell-type rotor 2. The A-phase rotor 2a and the B-phase rotor 2b are stacked and fixed to the rotation shaft 1.

In detail, the A-phase rotor 2a and the B-phase rotor 2b are stacked so that the second rotor core 20 (non-opposing surface 21c of the second rotor core base 21) of the A-phase rotor 2a contacts the second rotor core 20 (non-opposing surface 21c of the second rotor core base 21) of the B-phase rotor 2b.

As shown in FIG. 3, when viewing the A-phase motor Ma in the axial direction, the B-phase rotor 2b is shifted by a predetermined angle in the counterclockwise direction from to the A-phase rotor 2a.

In detail, the second rotor claw pole 23 (first rotor claw pole 13) of the B-phase rotor 2b is shifted by a predetermined electric angle θ2 in the counterclockwise direction from the second rotor claw pole 23 (first rotor claw pole 13) of the A-phase rotor 2a.

Stator 3

As shown in FIG. 2, the stator 3 has a two-layer two-phase structure including an A-phase stator 3a and a B-phase stator 3b, each having a Lundell-type structure. The A-phase stator 3a and the B-phase stator 3b are stacked in the axial direction. The A-phase stator 3a and the B-phase stator 3b are opposed to the corresponding A-phase rotor 2a and the B-phase rotor 2b.

Figure 7:
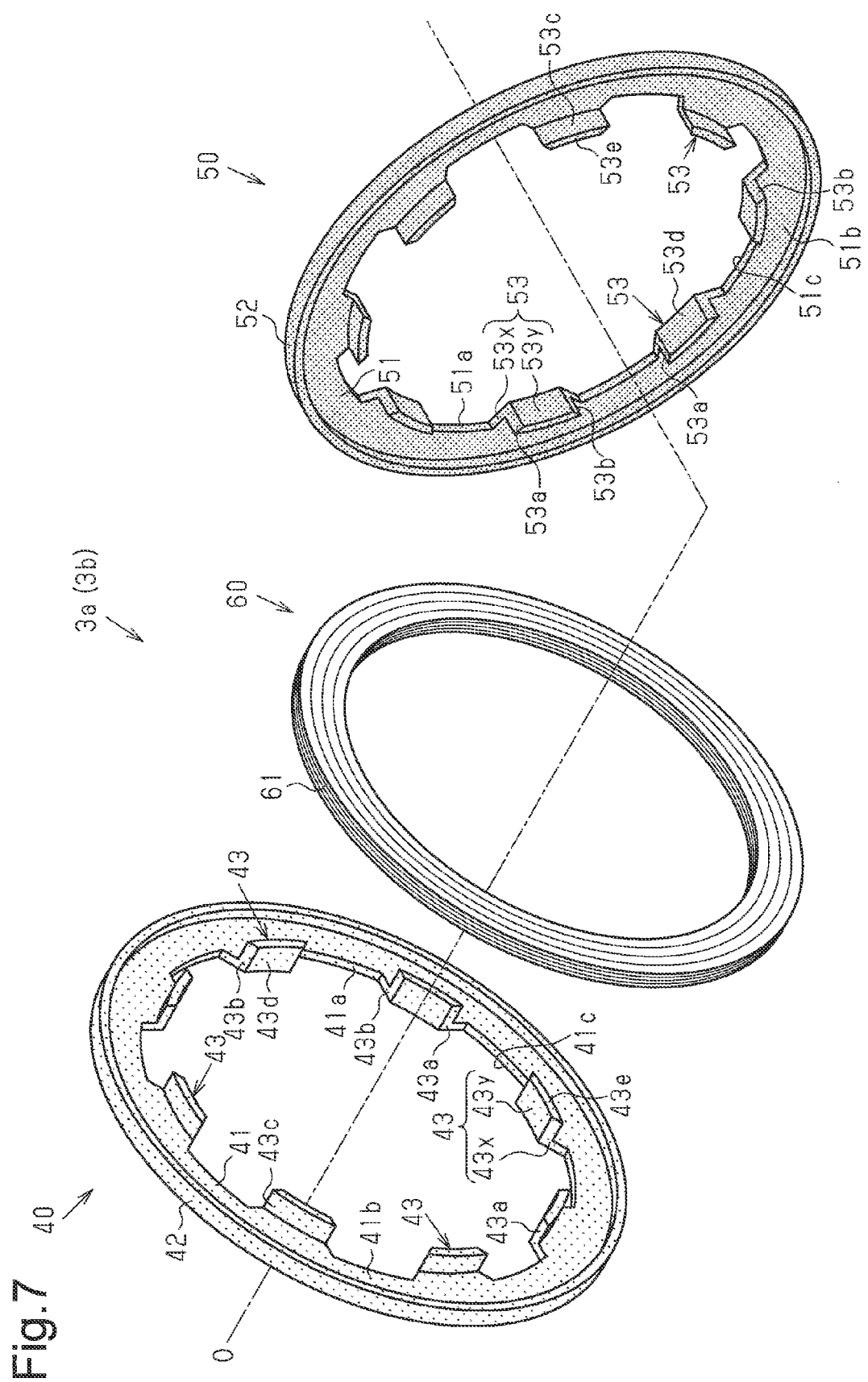
FIG. 7 is an exploded perspective view of a stator configuring the single motor shown in FIG. 5.

The A-phase stator 3a and the B-phase stator 3b have the same configuration. As shown in FIG. 7, the A-phase stator 3a and the B-phase stator 3b each include a first stator core 40, a second stator core 50, and a coil unit 60.

First Stator Core 40

As shown in FIG. 7, the first stator core 40 includes a first stator core base 41, which is formed by an annular electromagnetic steel plate. The first stator core base 41 includes an inner circumferential surface 41a, an opposing surface 41b opposed to the second stator core 50, and a non-opposing surface 41c. A first stator cylindrical outer wall 42 is formed at a radially outer side of the first stator core base 41. The first stator cylindrical outer wall 42 is extended toward the second stator core 50 in the axial direction. Eight first stator claw poles 43 are arranged at equal intervals on the inner circumferential surface 41a.

Each first stator claw pole 43 includes a first stator basal portion 43x and a first stator pole portion 43y. The first stator basal portion 43x projects toward the radially inner side from the inner circumferential surface 41a of the first stator core base 41. The first stator pole portion 43y is located at a distal end of the first stator basal portion 43x. The first stator pole portion 43y is bent from the first stator basal portion 43x and extended in the axial direction toward the second stator core 50. The first stator basal portion 43x is trapezoidal and has a width that decreases toward the radially inner side as viewed in the axial direction. The first stator pole portion 43y is tetragonal as viewed in the radial direction. Circumferential end surfaces 43a, 43b of the first stator claw pole 43, which includes the first stator basal portion 43x and the first stator pole portion 43y, are both.

The first stator pole portion 43y is has a sectoral cross-section in a direction orthogonal to the axial direction. The first stator pole portion 43y includes a radially outer surface 43c and a radially inner surface 43d. Each of the radially outer surface 43c and the radially inner surface 43d is arcuate and lies along a circle that is concentric with the inner circumferential surface 41a of the first stator core base 41 as viewed in the axial direction.

The circumferential angle of each first stator basal portion 43x, that is, the angle between the basal ends of the circumferential end surfaces 43a, 43b from the center axis O of the rotation shaft 1 is smaller than the angle of the gap between adjacent first stator claw poles 43. Second stator core 50

As shown in FIG. 7, the second stator core 50 is formed from the same material as the first stator core base 41 and shaped identically to the first stator core base 41. The second stator core 50 includes an annular second stator core base 51. The second stator core base 51 includes an inner circumferential surface 51a, an opposing surface 51b opposed to the first stator core 40, and a non-opposing surface 51c. A second stator cylindrical outer wall 52 is formed at a radially outer side of the second stator core base 51. The second stator cylindrical outer wall 52 is extended toward the first stator core 40 in the axial direction. The second stator cylindrical outer wall 52 contacts the first stator cylindrical outer wall 42 in the axial direction. Eight second stator claw poles 53 are arranged at equal intervals on the inner circumferential surface 51a of the second stator core base 51.

Each second stator claw pole 53 includes a second stator basal portion 53x and a second stator pole portion 53y. The second stator basal portion 53x projects toward the radially inner side from the inner circumferential surface 51a of the second stator core base 51. The second stator pole portion 53y is located at a distal end of the second stator basal portion 53x. The second stator pole portion 53y is bent from the second stator basal portion 53x and extended in the axial direction toward the first stator core 40. The second stator basal portion 53x is trapezoidal and has a width that decreases toward the radially inner side as viewed in the axial direction. The second stator pole portion 53y is tetragonal as viewed in the radial direction. Circumferential end surfaces 53a, 53b of the second stator claw pole 53, which includes the second stator basal portion 53x and the second stator pole portion 53y, are both flat.

The second stator pole portion 53y has a sectoral cross-section in a direction orthogonal to the axial direction. The second stator pole portion 53y includes a radially outer surface 53c and a radially inner surface 53d. Each of the radially outer surface 53c and the radially inner surface 53d is arcuate and lies along a circuit that is concentric with the inner circumferential surface 51a of the second stator core base 51 as viewed in the axial direction.

The circumferential angle of each second stator basal portion 53x, that is, the angle between the basal ends of the circumferential end surfaces 53a, 53b from the center axis O of the rotation shaft 1 is smaller than the angle of the gap between adjacent second stator claw poles 53.

The second stator core 50 and the first stator core 40 are identical in shape. The first stator cylindrical outer wall 42 of the first stator core base 41 is held in contact with the second stator cylindrical outer wall 52 of the second stator core base 51. The second stator claw poles 53 are located between the first stator claw poles 43 as viewed in the axial direction.

Each first stator claw poles 43 is arranged so that the distal end surface 43e of the first stator pole portion 43y is flush with the opposing surface 51b of the second stator core base 51. In the same manner, each second stator claw pole 53 is arranged so that the distal end surface 53e of the second stator pole portion 53y is flush with the opposing surface 41b of the first stator core base 41.

An annular cavity having a tetragonal cross-sectional is defined between the opposing surfaces 51b, 51b of the first and second stator core bases 41, 51 and the inner circumferential surfaces of the first and second stator cylindrical outer walls 52, 52. The coil unit 60 is arranged in the annular cavity, which has the tetragonal cross-section, and fixed to the first stator core 40 and the second stator core 50.

Coil Unit 60

As shown in FIGS. 5 and 7, the coil unit 60 includes an annular winding 61. The periphery of the annular winding 61 is covered by a coil insulating layer 62, which is formed by a resin molding. The coil insulating layer 62 is not shown in FIG. 7.

As shown in FIG. 5, the outer surface of the coil unit 60 opposed to the first stator core 40 in the axial direction contacts the opposing surface 41b of the first stator core base 41. The outer surface of the coil unit 60 opposed to the second stator core 50 in the axial direction contacts the opposing surface 51b of the second stator core base 51.

The coil unit 60 has a predetermined thickness (axial length) corresponding to the axial length of the first stator claw poles 43 (second stator claw poles 53). As shown in FIG. 5, the distal end surface 43e of each first stator claw pole 43 is flush with the opposing surface 51b of the second stator core base 51, and the distal end surface 53e of each second stator claw pole 53 is flush with the opposing surface 41b of the first stator core base 41.

The axial length from the non-opposing surface 41c of the first stator core base 41 to the non-opposing surface 51c of the second stator core base 51 conforms to the axial length from the non-opposing surface 11c of the first rotor core base 11 to the non-opposing surface 21c of the second rotor core base 21.

Accordingly, the axial length of the first stator claw poles 43 (second stator claw poles 53) conforms to the axial length of the first rotor claw poles 13 (second rotor claw poles 23).

In FIG. 7, a lead terminal of the annular winding 61 is not shown. FIG. 7 also does not show a slot formed in the cylindrical outer walls 42, 52 to extend the lead out terminal out of the first and second stator cores 40, 50.

The A-phase stator 3a and the B-phase stator 3b each include the first and second stator cores 40, 50 and the coil unit 60. The A-phase stator 3a and the B-phase stator 3b each have a Lundell-type structure and include sixteen poles. In detail, in each of the A-phase stator 3a and the B-phase stator 3b, the annular winding 61 excites the first and second stator claw poles 43, 53 to different polarities.

As shown in FIGS. 2 and 3, the A-phase stator 3a and the B-phase stator 3b are stacked in the axial direction to form the two-layer two-phase Lundell stator 3. The A-phase stator 3a and the B-phase stator 3b are stacked and fixed to the motor housing.

In detail, the A-phase stator 3a and the B-phase stator 3b are stacked so that the second stator core 50 (non-opposing surface 51c of the second stator core base 51) of the A-phase stator 3a contacts the second stator core 50 (non-opposing surface 51c of the second stator core base 51) of the B-phase stator 3b.

Referring to FIG. 3, as viewed in the A-phase motor Ma in the axial direction, the B-phase stator 3b is shifted by a predetermined angle in the clockwise direction from the A-phase stator 3a.

In detail, the first stator claw pole 43 (second stator claw pole 53) of the B-phase stator 3b is shifted by a predetermined electric angle θ1 in the clockwise direction from the first stator claw pole 43 (second stator claw pole 53) of the A-phase stator 3a.

As described above, the electric angle θ1 indicates the shift of the B-phase stator 3b from the A-phase stator 3a in the clockwise direction as viewed from the A-phase motor Ma in the axial direction. The electric angle θ2 indicates the shift of the B-phase rotor 2b from the A-phase rotor 2a in the counterclockwise direction as viewed from the A-phase motor Ma in the axial direction. The electric angle θ1 and the electric angle θ2 are set to satisfy the relational expression shown below.

θ1+|θ2|=90° (electric angle)

The above relational expression is set to avoid a dead point of the two-phase motor and improve the starting characteristics. The electric angles θ1, θ2 are set based on the above relational expression.

In the present embodiment, the electric angle θ2 is set to −45 degrees (counterclockwise direction), and the electric angle θ1 is set to 45 degrees (clockwise direction).

In the present embodiment, the electric angle θ2 is set to −45 degrees and the electric angle θ1 is set to 45 degrees. However, the electric angle θ2 and the electric angle θ1 may be changed within a range that satisfies the above relational expression.

An A-phase input voltage va of two-phase AC power is applied to the annular winding 61 of the A-phase stator 3a, and a B-phase input voltage vb of the two-phase AC power is applied to the annular winding 61 of the B-phase stator 3b.

The two-layer two-phase Lundell-type motor M includes a drive control circuit that will now be described with reference to FIG. 8.

Figure 8:
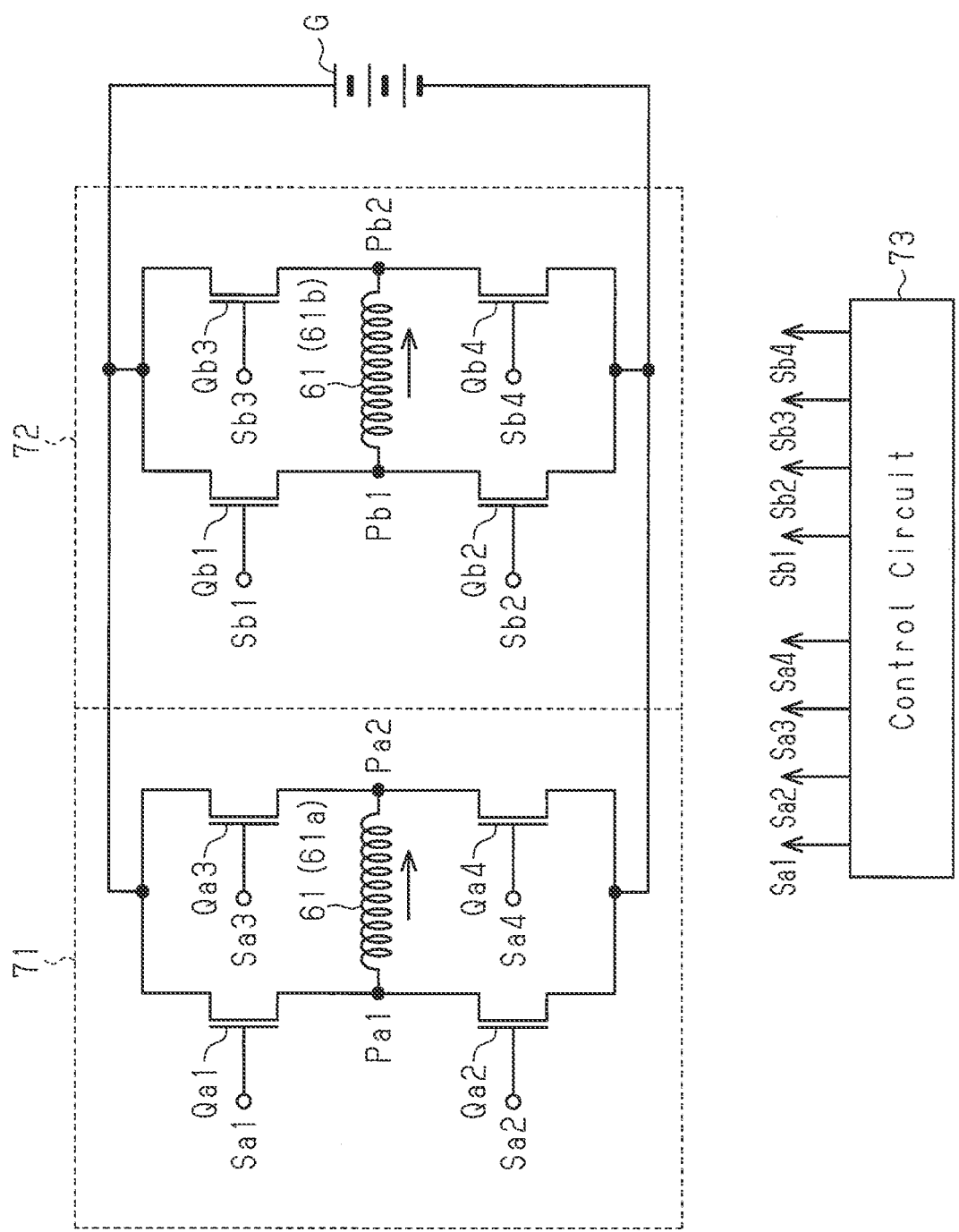
FIG. 8 is a drive control circuit diagram of the motor shown in FIG. 1.

As shown in FIG. 8, the drive control circuit includes an A-phase drive circuit unit 71, a B-phase drive circuit unit 72, and a control circuit 73 that drives and controls the two drive circuit units 71, 72.

A-Phase Drive Circuit Unit 71

The A-phase drive circuit unit 71 is formed by a known H-type bridge circuit to which 12 volts from a DC power supply G is applied. The A-phase drive circuit unit 71 includes four MOS transistors Qa1, Qa2, Qa3, and Qa4 that configure a first switching element. The four MOS transistors Qa1 to Qa4 are divided into the set of the MOS transistors Qa1, Qa4 and the set of the MOS transistors Qa2, Qa3. The transistors in each set are connected across the annular winding 61 (hereinafter referred to as A-phase annular winding 61a) of the A-phase stator 3a. The two sets are alternately activated and deactivated to energize the A-phase annular winding 61a.

More specifically, current flows through the A-phase annular winding 61a in the direction of the arrow shown in FIG. 8 (from winding end Pa1 to winding end Pa2 of A-phase annular winding 61a) when activating the set of MOS transistors Qa1, Qa4 and deactivating the set of MOS transistors Qa2, Qa3. In detail, current flows through the A-phase annular winding 61a in the clockwise direction as viewed from the A-phase motor Ma in the axial direction.

Current flows through the A-phase annular winding 61a in the direction opposite to the direction of the arrow shown in FIG. 8 (from winding end Pa2 to winding end Pa1 of A-phase annular winding 61a) when deactivating the set of MOS transistors Qa1, Qa4 and activating the set of MOS transistors Qa2, Qa3. In detail, current flows through the A-phase annular winding 61a in the counterclockwise direction as viewed from the A-phase motor Ma in the axial direction.

B-Phase Drive Circuit Unit 72

The B-phase drive circuit unit 72 is formed by a known H-type bridge circuit to which power from the DC power supply G is applied. The B-phase drive circuit unit 72 includes four MOS transistors Qb1, Qb2, Qb3, and Qb4 that configure a second switching element. The four MOS transistors Qb1 to Qb4 are divided into the set of MOS transistors Qb1, Qb4 and the set of MOS transistors Qb2, Qb3. The transistors in each set are connected across the annular winding 61 (hereinafter referred to as B-phase annular winding 61b) of the B-phase stator 3b. The two sets are alternately activated and deactivated to energize the B-phase annular winding 61b.

More specifically, current flows through the B-phase annular winding 61b in the direction of the arrow shown in FIG. 8 (from winding end Pb1 to winding end Pb2 of B-phase annular winding 61b) by activating the set of MOS transistors Qb1, Qb4 and deactivating the set of MOS transistors Qb2, Qb3. In detail, current flows through the B-phase annular winding 61b in the clockwise direction as viewed from the A-phase motor Ma in the axial direction.

Current flows through the B-phase annular winding 61b in the direction opposite to the direction of the arrow shown in FIG. 8 (from winding end Pb2 to winding end Pb1 of B-phase annular winding 61b) when deactivating the set of MOS transistors Qb1, Qb4 and activating the set of MOS transistors Qb2, Qb3. In detail, the current flowing through the B-phase annular winding 61b flows in the counterclockwise direction as viewed from the A-phase motor Ma in the axial direction.

Control Circuit 73

The control circuit 73 generates drive signals Sa1 to Sa4 respectively transmitted to the gate terminals of the MOS transistors Qa1 to Qa4 in the A-phase drive circuit unit 71. That is, the control circuit 73 generates the drive signals Sa1 to Sa4 that alternately activates and deactivates the set of the MOS transistors Qa1, Qa4 and the set of the MOS transistors Qa2, Qa3 to energize the A-phase annular winding 61a.

In detail, the control circuit 73 transmits the drive signals Sa1, Sa4, which have the same pulse waveform, to the gate terminals of the MOS transistors Qa1, Qa4 in one of the sets.

The control circuit 73 also transmits the drive signals Sa2, Sa3, which have the same pulse waveform and are complementary signals of the drive signals Sa1, Sa4, to the gate terminals of the MOS transistors Qa2, Qa3 in the other one of the sets. In this manner, the MOS transistors Qa1, Qa4 of one set and the MOS transistors Qa2, Qa3 of the other set are alternately activated and deactivated to energize the A-phase annular winding 61a.

Figure 9:
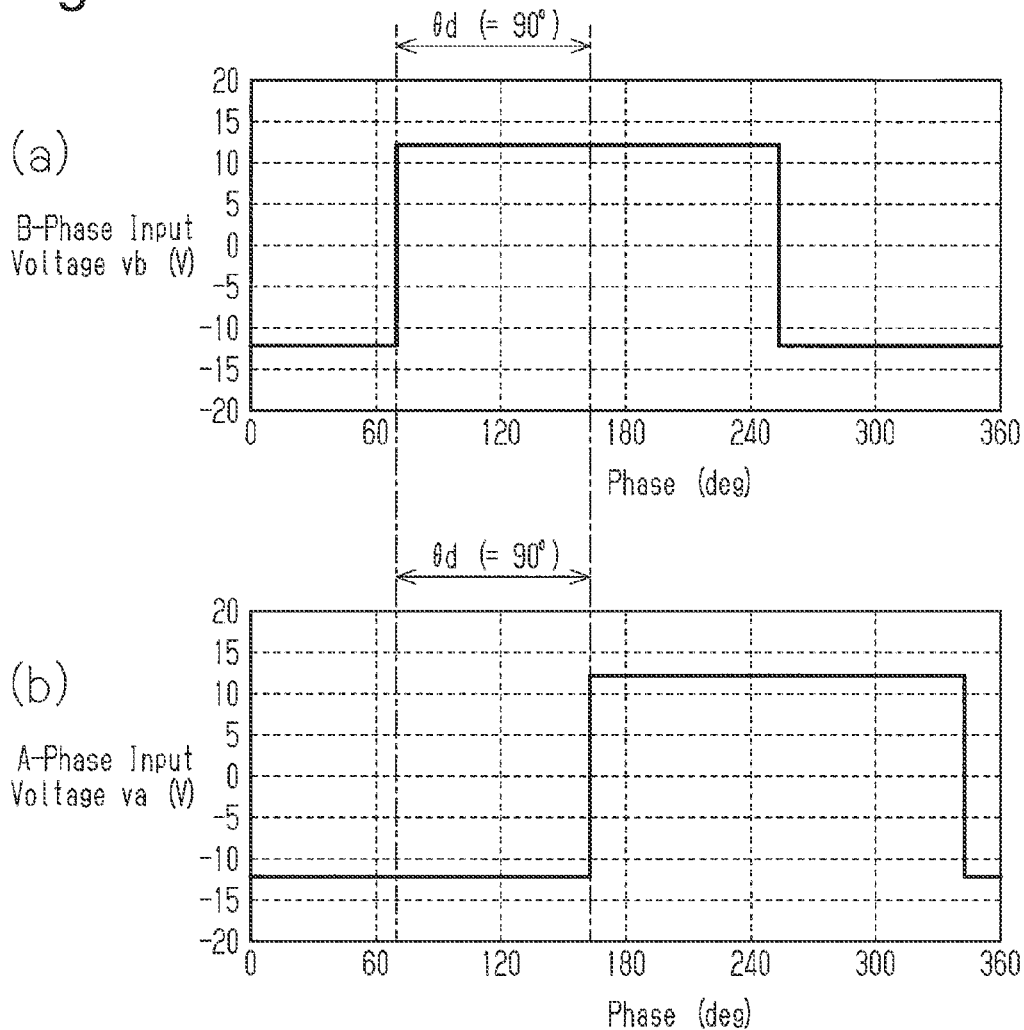
FIG. 9 is a waveform chart showing a B-phase input voltage supplied to a B-phase motor and an A-phase input voltage supplied to an A-phase motor.

A portion of (b) in FIG. 9 shows the voltage waveform of the A-phase input voltage va applied to the A-phase annular winding 61a. When the potential of the A-phase input voltage va (+12 volts) is applied to the winding end Pa1 of the A-phase annular winding 61a and the potential of 0 volts is applied to the winding end Pa2 of the A-phase annular winding 61a, current flows through the A-phase annular winding 61a in the clockwise direction as viewed from the A-phase motor Ma in the axial direction. When the potential of 0 volts is applied to the winding end Pa1 and the potential of the A-phase input voltage va (−12 volts) is applied to the winding end Pa2, current flows through the A-phase annular winding 61a in the counterclockwise direction as viewed from the A-phase motor Ma in the axial direction.

The control circuit 73 generates drive signals Sb1 to Sb4 respectively transmitted to the gate terminals of the MOS transistors Qb1 to Qb4 in the B-phase drive circuit unit 72. That is, the control circuit 73 generates the drive signals Sb1 to Sb4 that alternately activates and deactivates the set of MOS transistors Qb1, Qb4 and the set of MOS transistors Qb2, Qb3 to energize the B-phase annular winding 61b.

In detail, the control circuit 73 transmits the drive signals Sb1, Sb4, which have the same pulse waveform, to the gate terminals of the MOS transistors Qb1, Qb4 in one of the sets. Furthermore, the control circuit 73 transmits the drive signals Sb2, Sb3, which have the same pulse waveform and are complementary signals of the drive signals Sb1, Sb4, to the gate terminals of the MOS transistors Qb2, Qb3 in the other one of the sets. Therefore, the MOS transistors Qb1, Qb4 of one set and the MOS transistors Qb2, Qb3 of the other set are alternately activated and deactivated to energize the B-phase annular winding 61b.

A portion of (a) in FIG. 9 shows the voltage waveform of the B-phase input voltage vb applied to the B-phase annular winding 61b. When the potential of the B-phase input voltage vb (+12 volts) is applied to the winding end Pb1 of the B-phase annular winding 61b and the potential of 0 volts is applied to the winding end Pb2 of the B-phase annular winding 61b, the current flows through the B-phase annular winding 61b in the clockwise direction as viewed from the A-phase motor Ma in the axial direction. When the potential of 0 volts is applied to the winding end Pb1 and the potential of the B-phase input voltage vb (−12 volts) is applied to the winding end Pb2, current flows through the B-phase annular winding 61b in the counterclockwise direction as viewed from the A-phase motor Ma in the axial direction.

As shown in FIG. 9, the control circuit 73 applies the A-phase and B-phase input voltages va, vb at the same frequency to the A-phase and B-phase annular windings 61a, 61b. The control circuit 73 controls the A-phase and B-phase drive circuit units 71, 72 to shift the phase of the A-phase input voltage va from the B-phase input voltage vb.

In detail, as shown in FIG. 9, the phase of the A-phase input voltage va is delayed from the B-phase input voltage vb in the present embodiment. The phase difference θd is 90 degrees in the present embodiment.

The operation of the motor M will now be described.

The A-phase input voltage va and the B-phase input voltage vb are applied to the motor M. In other words, the A-phase input voltage va is applied to the annular winding 61a of the A-phase stator 3a, and the B-phase input voltage vb is applied to the annular winding 61b of the B-phase stator 3b. This generates a rotation field in the stator 3 that rotates and drives the rotor 2.

The stator 3 has a two-layer structure including the A-phase stator 3a and the B-phase stator 3b respectively corresponding to the A-phase input voltage va and the B-phase input voltage vb. Accordingly, the rotor 2 also has a two-layer structure including the A-phase rotor 2a and the B-phase rotor 2b. In the stators 3a, 3b and the rotors 2a, 2b, the axially opposed stators of the two phases each receive the magnetic flux of the field magnet 30. This increases the output of the motor.

A Lundell-type rotor may have a three-layer structure including stacked rotors respectively corresponding to the U-phase, the V-phase, and the W-phase. Field magnets are provided for the rotors of the U-phase, the V-phase, and the W-phase. In such a case, the field magnets for two phases are magnetized in the same direction, and the field magnet for the remaining phase is magnetized in the opposite direction. In the relationship of the rotors of the U-phase, the V-phase, and the W-phase, the claw poles produce a difference in the magnetic flux between the phases. This greatly disturbs the magnetic balance of the rotor as a whole.

In the present embodiment, the rotor 2 has a two-layer structure including the A-phase rotor 2a and the B-phase rotor 2b. The field magnet 30 of the A-phase rotor 2a and the field magnet 30 of the B-phase rotor 2b are magnetized in opposite directions. Therefore, the disturbance in the magnetic balance of each claw pole 13, 23 is small due to the relationship of the A-phase rotor 2a and the B-phase rotor 2b.

Thus, the disturbance of the magnetic balance in the claw poles 43, 53 formed on the opposing A-phase stator 3a and the B-phase stator 3b may be reduced. This improves the motor performance.

Furthermore, in the present embodiment, the electric angle θ1 and the electric angle θ2 are set to values based on θ1+|θ2|=90° (electric angle). The electric angle θ1 indicates the shift in the clockwise direction of the B-phase stator 3b from the A-phase stator 3a. The electric angle θ2 indicates the shift in the counterclockwise direction of the B-phase rotor 2b from the A-phase rotor 2a.

In detail, in the stator 3, the B-phase stator 3b is shifted by the predetermined electric angle θ1 (45 degrees) in the clockwise direction from the A-phase stator 3a as viewed from the A-phase motor Ma in the axial direction. In the rotor 2, the B-phase rotor 2b is shifted by the predetermined electric angle θ2 (45 degrees) in the counterclockwise direction from the A-phase rotor 2a as viewed from the A-phase motor Ma in the axial direction.

This allows for avoidance of the dead point, which would disable starting in a two-phase motor, and improves the starting characteristics.

Moreover, the movement amount (rotation amount) of the rotor 2 can be increased with respect to the switching of the first and second stator claw poles 43, 53 resulting from the current flowing to the A-phase and B-phase annular winding 61, 61b of the A-phase and B-phase stators 3a, 3b. This allows the rotation speed of the motor to be increased.

Further, the A-phase input voltage va of the A-phase stator 3a of the stator 3 is delayed by a phase difference θd of 90 degrees from the B-phase input voltage vb of the B-phase stator 3b.

More specifically, a leakage magnetic flux generated between the claw poles 13, 23 in the A-phase and B-phase rotors 2a, 2b reduces the effective magnetic flux. The leakage magnetic flux distorts the magnetic flux distribution. The produces vibration and lowers the output. In the present embodiment, a phase difference θd of 90 degrees is provided between the A-phase input voltage va of the A-phase stator 3a and the B-phase input voltage vb of the B-phase stator 3b. This reduces vibration of the motor M and increases the output.

Figure 10:
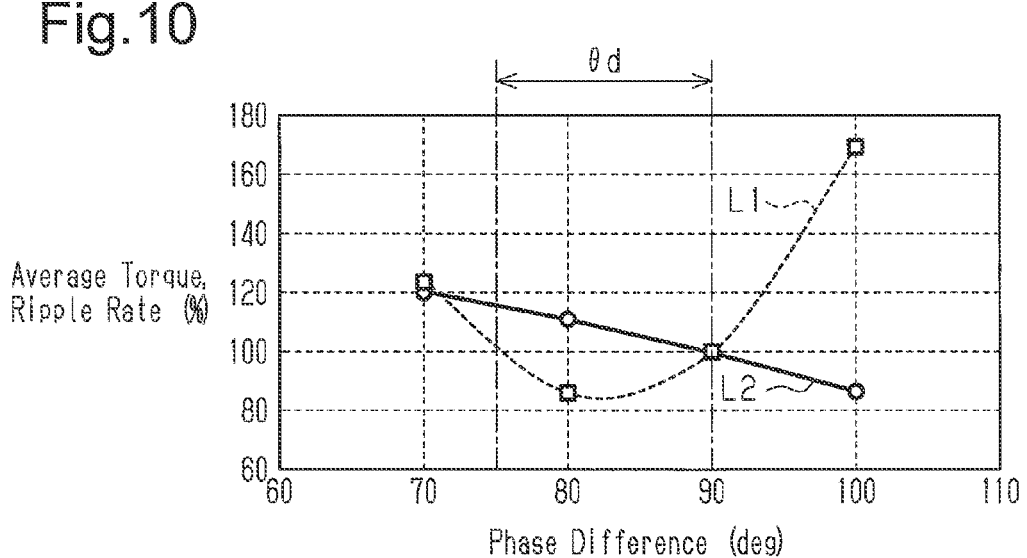
FIG. 10 is a graph showing the average torque and the ripple rate with respect to a phase difference of the input voltage of the A-phase motor and the input voltage of the B-phase motor.

The phase difference θd was changed within 70 degrees to 100 degrees to check the ripple rate and the average torque of each phase difference θd. FIG. 10 shows the test results. In the test, the ripple rate and the average torque at phase differences θd from 70 degrees to 100 degrees were obtained using the phase difference θd of 90 degrees as a reference (100%).

Referring to FIG. 10, the ripple rate shown by characteristic line L1 decreases as the phase difference θd increases from 70 degrees to 82 degrees, and the ripple rate increases as the phase difference θd increases from 82 degrees to 100 degrees. Therefore, the minimum ripple rate can be obtained when the phase difference θd is 82 degrees.

Further, in FIG. 10, the average torque shown by characteristic line L2 decreases as the phase difference θd increases from 70 degrees to 100 degrees.

Thus, the phase difference θd is set in a range from 75 degrees to 90 degrees to the ripple rate to 100% or less and maintain the average torque of 100% or greater. Such a setting improves the motor performance.

Further, the A-phase drive circuit unit 71, which drives (energizes) the A-phase annular winding 61a, and the B-phase drive circuit unit 72, which drives (energizes) the B-phase annular winding 61b, are each configured by an H-type bridge circuit. The A-phase and B-phase input voltages va, vb may be applied to the A-phase annular winding 61a and the B-phase annular winding 61b within a full range from +12 volts to −12 volts. Therefore, a high output motor can be obtained even with the two-layer, two phase multi-Lundell-type motor M.

As described above in detail, the first embodiment has the advantages described below.

(1) In the embodiment described above, the motor M is a two-layer two-phase motor. More specifically, the stator 3 has a two-stage structure including the A-phase and B-phase stators 3a, 3b. Accordingly, the rotor 2 has a two-stage structure including the A-phase and B-phase rotors 2a, 2b. The A-phase input voltage va is applied to the A-phase stator 3a, and the B-phase input voltage vb is applied to the B-phase stator 3a. In the stators 3a, 3b and the rotors 2a, 2b for each of the phases, the magnetic flux of the field magnet 30 in each of the rotors 2a, 2b is received by the axially opposed corresponding stators 3a, 3b. This increases the output of the motor M.

Moreover, the A-phase rotor 2a and the B-phase rotor 2b each have a two-layer structure. The field magnet 30 of the A-phase rotor 2a and the field magnet 30 of the B-phase rotor 2b are magnetized in opposite directions. Accordingly, the A-phase rotor 2a and the B-phase rotor 2b reduces disturbance in the magnetic balance of the claw poles 13, 23 and improves the motor performance.

(2) In the embodiment described above, the B-phase stator 3b is shifted from the A-phase stator 3a by the electric angle θ1 (45 degrees) in the clockwise direction as viewed in the axial direction from the A-phase motor Ma. The B-phase rotor 2b is shifted from the A-phase rotor 2a by the electric angle θ2 (45 degrees) in the counterclockwise direction as viewed from the A-phase motor Ma in the axial direction.

This allows for avoidance of the dead point, which would disable starting in a two-phase motor, and improves the starting characteristics.

Moreover, the movement amount (rotation amount) of the rotor 2 can be increased with respect to the switching of the first and second stator claw poles 43, 53 resulting from the current flowing to the A-phase and B-phase annular winding 61, 61b of the A-phase and B-phase stators 3a, 3b. This allows the rotation speed of the motor to be increased.

(3) In the embodiment described above, the A-phase input voltage va of the A-phase stator 3a in the stator 3 is delayed from the B-phase input voltage vb of the B-phase stator 3b by the phase difference θd of 75 degrees to 90 degrees. This improves the motor performance in which the ripple rate is limited to 100% or less and the average torque is held at 100% or greater.

(4) In the embodiment described above, the A-phase and B-phase drive circuit units 71, 72 are each configured by an H-type bridge circuit, and the A-phase and B-phase input voltages va, vb are applied to the A-phase and B-phase annular windings 61, 61b within the full range from +12 volts to −12 volts. Therefore, a high output motor is obtained even with the two-layer two-phase multi-Lundell-type motor M.

Second Embodiment

A second embodiment of the motor M having the two-layer two-phase structure will now be described. The motor M of the present embodiment differs from the motor M of the first embodiment only in the configuration of the annular winding 61 in the coil unit 60 of the A-phase and B-phase stators 3a, 3b of the first embodiment. The differences will now be described in detail.

Figure 11:
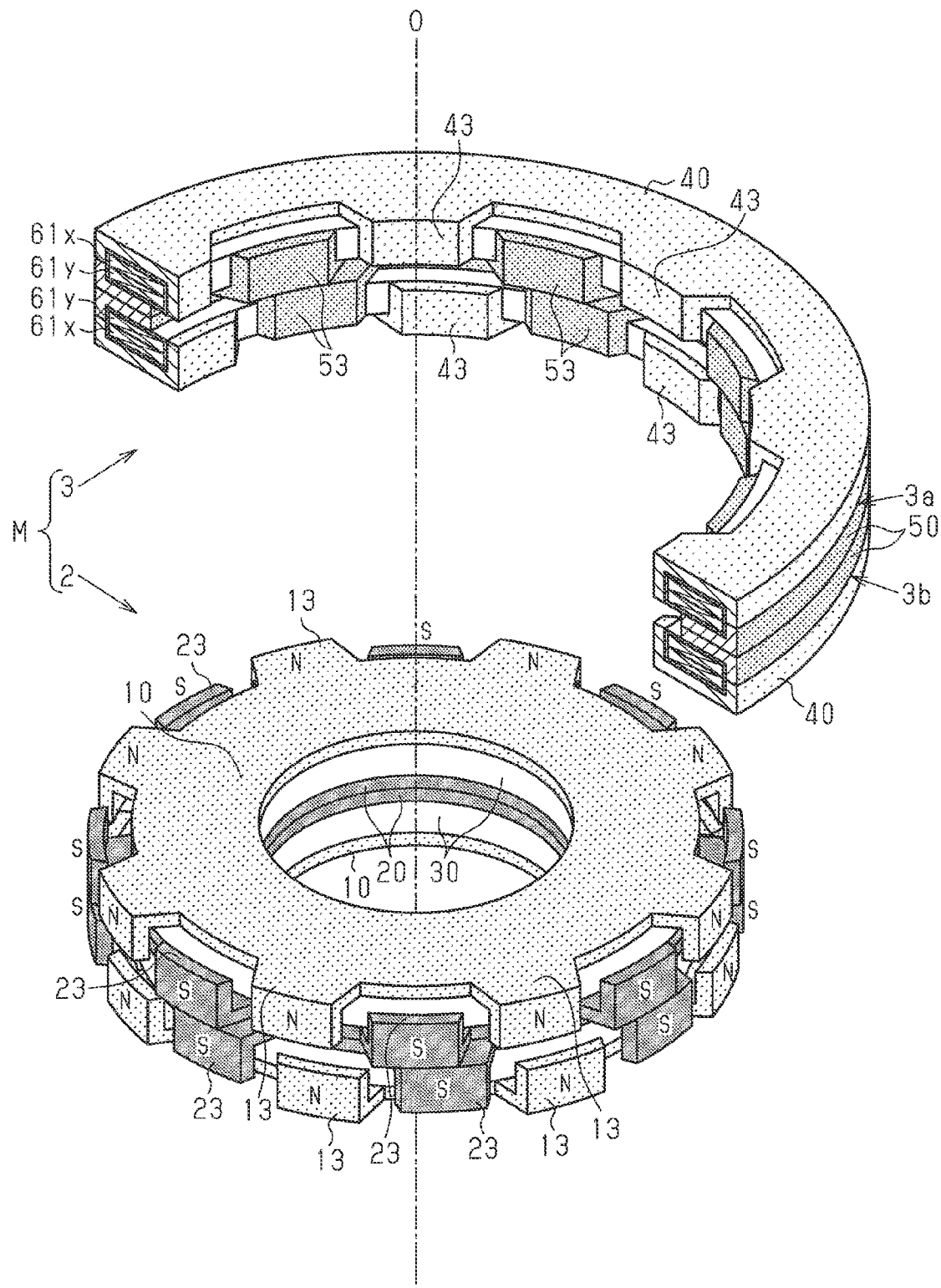
FIG. 11 is an exploded perspective view showing a motor in a second embodiment in which a stator is partially cut.

As shown in FIG. 11, each of the A-phase and B-phase stator 3a, 3b includes an annular cavity having a square cross-section between the first and second stator core bases 41, 51. The annular cavity accommodates a first system annular winding 61x and a second system annular winding 61y. The first system annular winding 61x and the second system annular winding 61y are covered by the coil insulating layer 62.

In each of the A-phase and B-phase stators 3a, 3b, the first system annular winding 61x and the second system annular winding 61y are stacked in the axial direction. The first system annular winding 61x is arranged closer to the first stator core 40, and the second system annular winding 61y is arranged closer to the second stator core 50.

Figure 12:
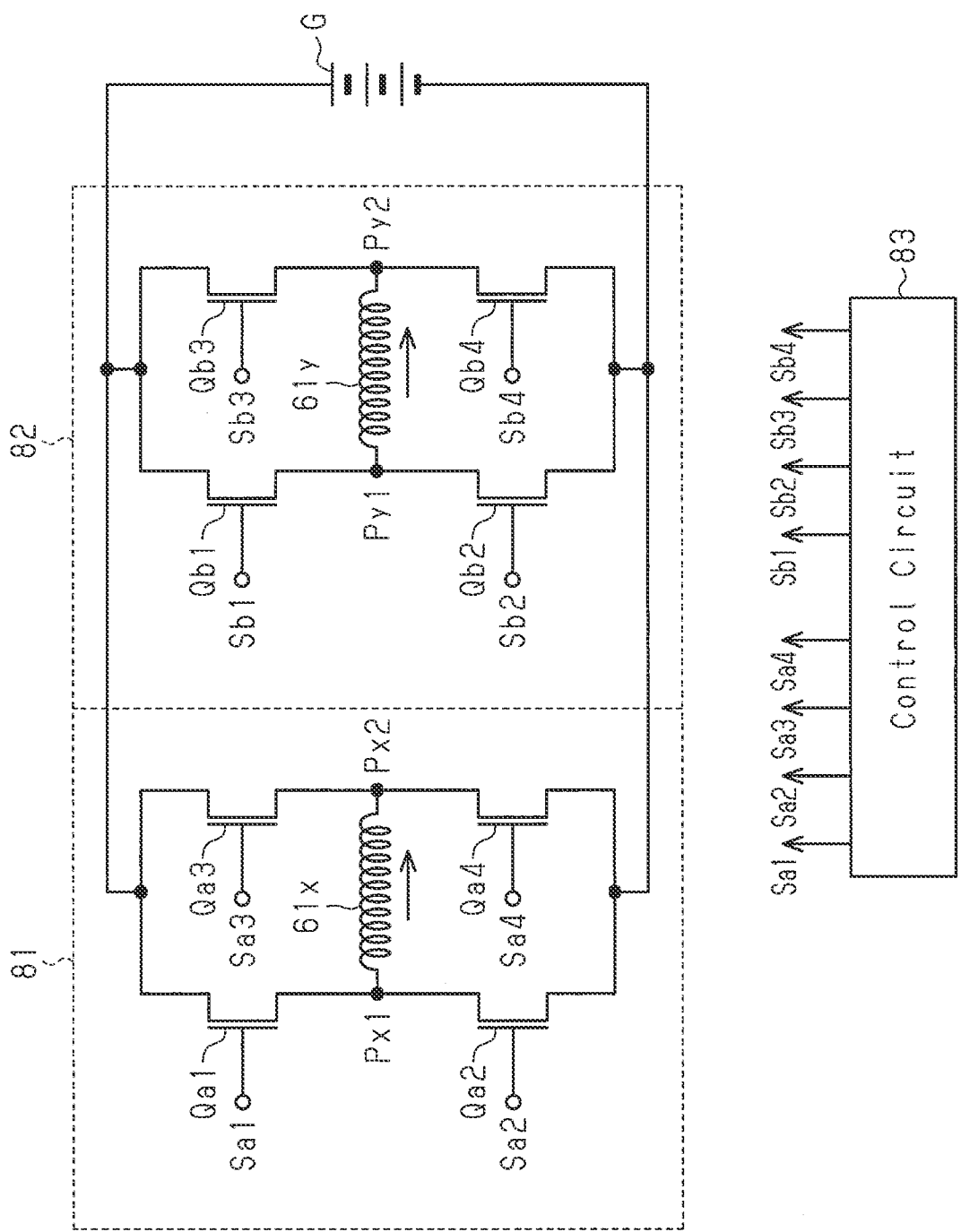
FIG. 12 is a drive control circuit diagram of the motor shown in FIG. 11.

FIG. 12 shows a drive control circuit of the motor M that energizes the first system annular winding 61x and the second system annular winding 61y of each phase. In FIG. 12, reference numeral "61x" entirely represents the A-phase and B-phase first system annular windings 61x that are connected in series. Reference numeral "61y" entirely represents the A-phase and B-phase second system annular windings 61y that are connected in series.

In the present embodiment, the series-connected A-phase and B-phase first system annular windings 61x and the series-connected second system annular windings 61y are driven and controlled.

Instead, A-phase and B-phase first system annular windings 61x that are connected in parallel and A-phase and B-phase second system annular windings 61y that are connected in parallel may be driven and controlled.

The A-phase first system annular winding 61x and the B-phase first system annular winding 61x may be driven and controlled separately. The A-phase second system annular winding 61y and the B-phase second system annular winding 61y may be driven and controlled separately.

The DC power supply G of 12 volts is applied to the first system annular winding 61x by a first system drive circuit unit 81. The first system drive circuit unit 81 is configured by a known H-type bridge circuit including four MOS transistors Qa1, Qa2, Qa3, and Qa4. The four MOS transistors Qa1 to Qa4 are divided into the set of MOS transistors Qa1, Qa4 and the set of MOS transistors Qa2, Qa3 that are connected across the first system annular winding 61x in between. The two sets are alternately activated and deactivated to energize the first system annular winding 61x.

More specifically, current flows through the first system annular winding 61x in the direction of the arrow shown in FIG. 12 (from winding end Px1 to winding end Px2 of first system annular winding 61x) by activating the set of MOS transistors Qa1, Qa4 and deactivating the set of MOS transistors Qa2, Qa3. In detail, current flows in the clockwise direction through the first system annular windings 61x in the A-phase and B-phase motors Ma, Mb as viewed from the A-phase motor Ma in the axial direction.

Current flows through the first system annular winding 61x in the direction opposite to the direction of the arrow shown in FIG. 12 (from winding end Px2 to winding end Px1 of first system annular winding 61x) by deactivating the set of MOS transistors Qa1, Qa4 and activating the set of MOS transistors Qa2, Qa3. In detail, current flows in the counterclockwise direction through the first system annular windings 61x in the A-phase and B-phase motors Ma, Mb as viewed from the A-phase motor Ma in the axial direction.

Further, voltage from the DC power G is applied to the second system annular winding 61y by a second system drive circuit unit 82. The second system drive circuit unit 82 is configured by a known H-type bride circuit including four MOS transistors Qb1, Qb2, Qb3, and Qb4. The four MOS transistors Qb1 to Qb4 are divided into the set MOS transistors Qb1, Qb4 and the set of MOS transistors Qb2, Qb3 that are connected across the second system annular winding 61y. The two sets are alternately activated and deactivated to energize the second system annular winding 61y.

More specifically, current flows through the second system annular winding 61y in the direction of the arrow shown in FIG. 12 (from winding end Py1 to winding end Py2 of second system annular winding 61y) by activating the set of MOS transistors Qb1, Qb4 and deactivating the set of MOS transistors Qb2, Qb3. In detail, current flows in the clockwise direction through the second system annular windings 61y in the A-phase and B-phase motors Ma, Mb as viewed from the A-phase motor Ma in the axial direction.

Current flows through the second system annular winding 61y in the direction opposite to the direction of the arrow shown in FIG. 12 (from winding end Py2 to winding end Py1 of second system annular winding 61y) by deactivating the set of MOS transistors Qb1, Qb4 and activating the set of MOS transistors Qb2, Qb3. In detail, current flows in the counterclockwise direction through the second system annular winding 61y in the A-phase and B-phase motors Ma, Mb as viewed from the A-phase motor Ma in the axial direction.

The control circuit 83 generates drive signals Sa1 to Sa4 respectively transmit to the gate terminals of the MOS transistors Qa1 to Qa4 in the first system drive circuit unit 81. That is, the control circuit 83 generates the drive signals Sa1 to Sa4 that alternately activate and deactivate the set of MOS transistors Qa1, Qa4 and the set of MOS transistors Qa2, Qa3 to energize the first system annular winding 61x.

In detail, the control circuit 83 transmits the drive signals Sa1, Sa4, which have the same pulse waveform, to the gate terminals of the MOS transistors Qa1, Qa4 in one of the sets. The control circuit 83 also transmits drive signals Sa2, Sa3, which have the same pulse waveform and are complementary signals of the drive signals Sa1, Sa4, to the gate terminals of the MOS transistors Qa2, Qa3 in the other one of the sets. Therefore, the MOS transistors Qa1, Qa4 of one set and the MOS transistors Qa2, Qa3 of the other set are alternately activated to energize the first system annular winding 61x of each phase.

Figure 13:
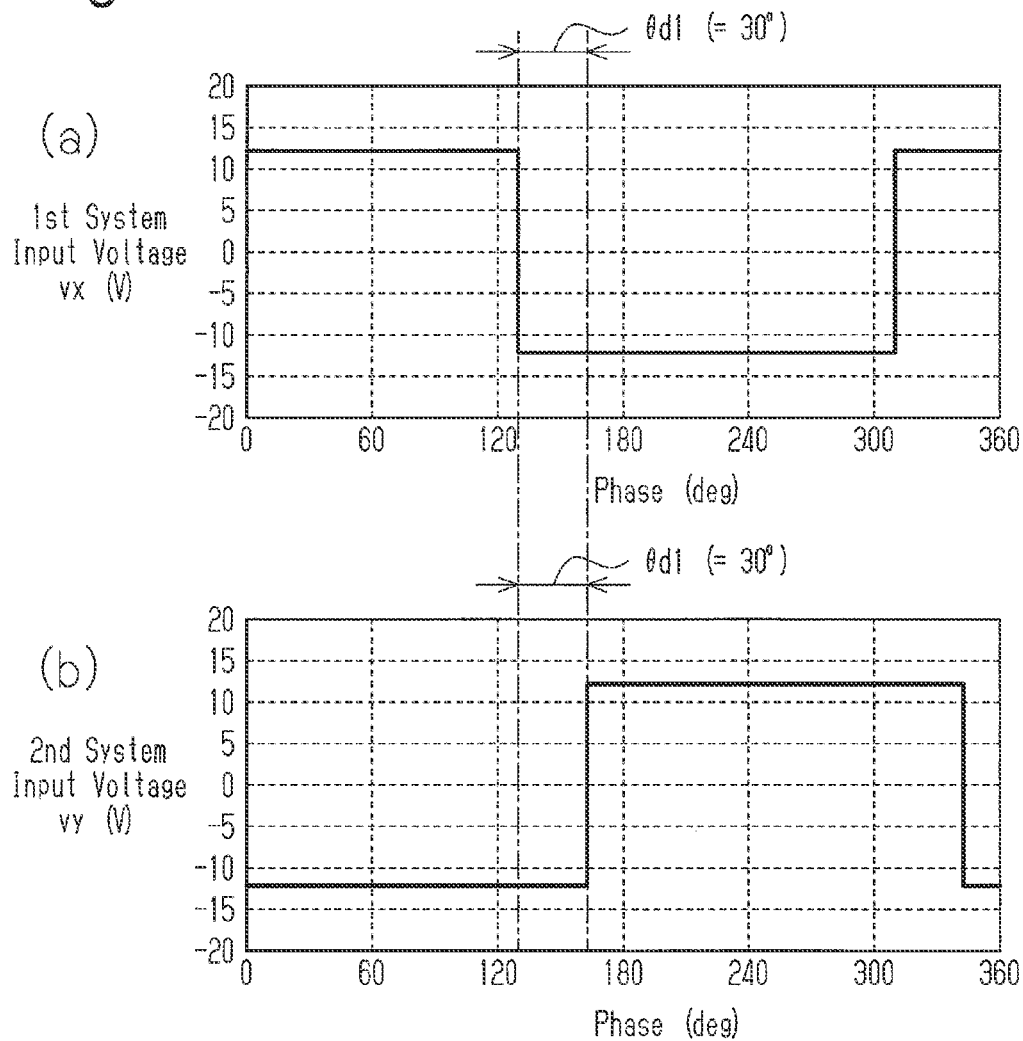
FIG. 13 is a waveform chart showing a first system input voltage supplied to a first system annular winding and a second system input voltage supplied to a second system annular winding.

A portion of (a) in FIG. 13 indicates the voltage waveform of the first system input voltage vx applied to the first system annular winding 61x. When the potential of the first system input voltage vx (+12 volts) is applied to the winding end Px1 of the first system annular winding 61x and the potential of 0 volts is applied to the winding end Px2 of the first system annular winding 61x, current flows through the first system annular winding 61x in the clockwise direction as viewed from the A-phase motor Ma in the axial direction. When the potential of 0 volts is applied to the winding end Px1 and the potential of the first system input voltage vx (−12 volts) is applied to the winding end Px2, current flows through the first system annular winding 61x in the counterclockwise direction as viewed from the A-phase motor Ma in the axial direction.

The control circuit 83 generates drive signals Sb1 to Sb4 respectively transmitted to the gate terminals of the MOS transistors Qb1 to Qb4 in the second system drive circuit unit 82. That is, the control circuit 83 generates the drive signals Sb1 to Sb4 that alternately activate and deactivate the set of MOS transistors Qb1, Qb4 and the set of MOS transistors Qb2, Qb3 to energize the second system annular winding 61y.

In detail, the control circuit 83 transmits the drive signals Sb1, Sb4, which have the same pulse waveform, to the gate terminals of the MOS transistors Qb1, Qb4 in one of the sets. Furthermore, the control circuit 83 transmits the drive signals Sb2, Sb3, which have the same pulse waveform and are complementary signals of the drive signals Sb1, Sb4, to the gate terminals of the MOS transistors Qb2, Qb3 in the other one of the sets. Therefore, the MOS transistors Qb1, Qb4 of one set and the MOS transistors Qb2, Qb3 of the other set are alternately activated and deactivated to energize the second system annular winding 61y.

A portion of (b) in FIG. 13 shows the voltage waveform of the second system input voltage vy applied to the second system annular winding 61y. When the potential of the second system input voltage vy (+12 volts) is applied to the winding end Py1 of the second system annular winding 61y and a potential of 0 volts is applied to the winding end Py2 of the second system annular winding 61y, current flows through the second system annular winding 61y in the clockwise direction as viewed from the A-phase motor Ma in the axial direction. When the potential of 0 volts is applied to the winding end Py1 and the potential of the second system input voltage vy (−12 volts) is applied to the winding end Py2, current flows through the second system annular winding 61y in the counterclockwise direction as viewed from the A-phase motor Ma in the axial direction.

As shown in FIG. 13, the control circuit 83 applies the first and second system input voltages vx, vy at the same frequency to the first and second system annular windings 61x, 61y. The control circuit 83 controls the first and second system drive circuit units 81, 82 to shift the phase of the second system input voltage vy from the first system input voltage vx.

In detail, as shown in FIG. 13, in the present embodiment, the first system input voltage vx falls from a positive voltage to a negative voltage. Then, after a delay of a predetermined phase difference θd1, the second system input voltage vy rises from a negative voltage to a positive voltage.

As shown in FIG. 13, in the present embodiment, the phase difference θd1 is 30 degrees.

The operation of the second embodiment will now be described.

The first system input voltage vx and the second system input voltage vy are applied to the motor M. In other words, the first system input voltage vx is applied to the first system annular windings 61x of the A-phase and B-phase stators 3a, 3b, and the second system input voltage vy is applied to the second system annular windings 61y of the A-phase and B-phase stators 3a, 3b. This generates a rotation field in the A-phase and B-phase stators 3a, 3b of the stator 3 that rotates and drives the rotor 2.

As shown in FIG. 13, in the relationship of the first and second system input voltages vx and vy, the first system input voltage vx falls from a positive voltage to a negative voltage, and then the second system input voltage vy rises from a negative voltage to a positive voltage with a phase difference of θd1 of 30 degrees.

In the same manner as the first embodiment, a leakage magnetic flux generated between the claw poles 13, 23 of the A-phase and B-phase rotors 2a, 2b. The leakage magnetic flux distorts the magnetic flux distribution and produces vibration.

In the present embodiment, the first system input voltage vx falls from a positive voltage to a negative voltage, and then the second system input voltage vy rises from a negative voltage to a positive voltage with a phase difference θd1 of 30 degrees. Vibration of the motor M is reduced in such a manner.

Figure 14:
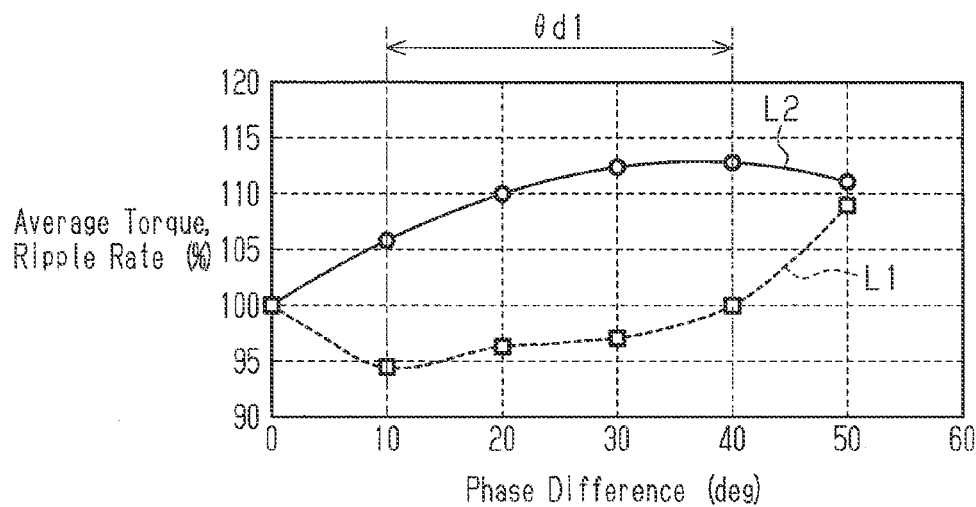
FIG. 14 is a graph showing the average torque and the ripple rate with respect to a phase difference of the first system input voltage and the second system input voltage.

The phase difference θd1 was changed within 0 degrees to 50 degrees to check the ripple rate and the average torque of each phase difference θd1. FIG. 14 shows the test results. In the test, the ripple rate and the average torque at phase differences θd1 from 0 degrees to 50 degrees were obtained using the phase difference θd1 of 0 degrees as a reference (100%).

Referring to FIG. 14, the ripple rate shown by characteristic line L1 is 100% or less when the phase difference θd1 is 0 degrees to 40 degrees, and is 100% or greater when the phase difference θd1 exceeds 40 degrees.

Further, in FIG. 14, the average torque shown by the characteristic line L2 increases as the phase difference θd1 increases when the phase difference θd1 is 0 degrees to 40 degrees. The average torque decreases when the phase difference θd1 exceeds 40 degrees.

Therefore, the phase difference θd1 is set in a range from 10 degrees to 40 degrees to reduce the ripple rate to 100% or less and maintain the average torque at 105% or greater. Such a setting improves the motor performance.

The first system drive circuit unit 81, which drives (energizes) the first system annular winding 61x, and the second system drive circuit unit 82, which drives (energizes) the second system annular winding 61y, are configured by H-type bridge circuits. The first and second system input voltages vx, vy may be applied to the first system annular winding 61x and the second system annular winding 61y in a full range from +12 volts to −12 volts. Therefore, high output motor can be obtained even with the two-layer, two-phase multi Lundell-type motor M.

As described above in detail, the second embodiment has the following advantages in addition to advantages (1) and (2) of the first embodiment.

(3) In the second embodiment, the first system input voltage vx falls from a positive voltage to a negative voltage. Then, the second system input voltage vy rises from a negative voltage to a positive voltage with the phase difference θd1 of 10 degrees to 40 degrees. This limits the ripple rate to 100% or less, holds the average torque at 105% or greater, and improves the motor performance than or equal to.

(4) In the embodiment described above, the first and second system drive circuit units 81, 82 are configured by the H-type bridge circuits. Further, the first and second system input voltages vx, vy are applied to the first and second system annular windings 61x, 61y in a full range of +12 volts to −12 volts. Therefore, high output motor is obtained even with the two-layer two-phase multi-Lundell-type motor M.

Third Embodiment

A third embodiment of the motor will now be described with reference to FIGS. 17 and 18.

The motor M of the present embodiment is similar to that of the first embodiment and thus will not be described in detail. The third embodiment differs from the first embodiment in the configuration of the drive control circuit. The differences will now be described in detail.

As shown in FIG. 17, the drive control circuit includes the A-phase drive circuit unit 71, the B-phase drive circuit unit 72, and the control circuit 73 that drive and control the two drive circuit units 71, 72.

A-Phase Drive Circuit Unit 71

The A-phase drive circuit unit 71 includes a MOS transistor Qa that serves as a first switching element and an annular winding 61 (hereinafter referred to as A-phase annular winding 61a) of the A-phase stator 3a connected in series to the MOS transistor Qa. The series circuit of the MOS transistor Qa and the A-phase annular winding 61a is connected to the DC power supply G. The MOS transistor Qa is activated and deactivated (opened and closed) to apply the power supply voltage of 12 volts from the DC power G to the A-phase annular winding 61a.

More specifically, the power supply voltage (hereinafter referred to as the A-phase input voltage va) of the DC power supply G is applied to the A-phase annular winding 61a by activating the MOS transistor Qa so that current flows in the direction of the arrow shown in FIG. 17. Current flows through the A-phase annular winding 61a in the clockwise direction as viewed from the A-phase motor Ma in the axial direction.

Deactivation of the MOS transistor Qa interrupts the A-phase input voltage va from the DC power supply G to the A-phase annular winding 61a so that current does not flow to the A-phase annular winding 61a.

Therefore, current always flows through the A-phase annular winding 61a in the direction of the arrow shown in FIG. 17. Current flows in the clockwise direction as viewed from the A-phase motor Ma in the axial direction.

B-Phase Drive Circuit Unit 72

The B-phase drive circuit unit 72 includes a MOS transistor Qb that serves as a second switching element and an annular winding 61 (hereinafter referred to as B-phase annular winding 61b) of the B-phase stator 3b connected in series to the MOS transistor Qb. The series circuit including the MOS transistor Qb and the B-phase annular winding 61b is connected to the DC power supply G. The MOS transistor Qb is activated and deactivated (opened and closed) to apply the power supply voltage of the DC power supply G to the B-phase annular winding 61b.

More specifically, the power supply voltage (hereinafter referred to as B-phase input voltage vb) of the DC power supply G is applied to the B-phase annular winding 61b by activating the MOS transistor Qb so that current flows in the direction of the arrow shown in FIG. 17. Current flows through the B-phase annular winding 61b in the clockwise direction as viewed from the A-phase motor Ma in the axial direction.

Deactivation of the MOS transistor Qb interrupts the B-phase input voltage vb from the DC power supply G to the B-phase annular winding 61b so that current does not flow to the B-phase annular winding 61b.

Therefore, current always flows through the B-phase annular winding 61b in the direction of the arrow shown in FIG. 17. Current flows in the clockwise direction as viewed from the A-phase motor Ma in the axial direction.

Control Circuit 73

The control circuit 73 generates a drive signal Sa transmitted to the gate terminal of the MOS transistor Qa of the A-phase drive circuit unit 71. That is, the control circuit 73 generates the drive signal Sa that activates and deactivates the MOS transistor Qa to energize the A-phase annular winding 61a in the direction of the arrow shown in FIG. 17.

A portion of (a) in FIG. 18 shows the voltage waveform of the A-phase input voltage va applied to the A-phase annular winding 61a. When the MOS transistor Qa is activated and the A-phase input voltage va (+12 volts) is applied to the A-phase annular winding 61a, current flows through the A-phase annular winding 61a in the clockwise direction as viewed from the A-phase motor Ma in the axial direction.

Deactivation of the MOS transistor Qa interrupts the A-phase input voltage va to the A-phase annular winding 61a so that current does not flow to the A-phase annular winding 61a.

The control circuit 73 generates a drive signal Sb transmitted to the gate terminal of the MOS transistor Qb of the B-phase drive circuit unit 72. That is, the control circuit 73 generates the drive signal Sb that activates and deactivates the MOS transistor Qb to energize the B-phase annular winding 61b in the direction of the arrow shown in FIG. 17.

A portion of (b) in FIG. 18 indicates the voltage waveform of the B-phase input voltage vb applied to the B-phase annular winding 61b. When the MOS transistor Qb is activated and the B-phase input voltage va (+12 volts) is applied to the B-phase annular winding 61b, current flows through the B-phase annular winding 61b in the clockwise direction as viewed from the A-phase motor Ma in the axial direction.

When deactivation of the MOS transistor Qb interrupts the B-phase input voltage vb to the B-phase annular winding 61b, current does not flow to the B-phase annular winding 61b.

As shown in FIG. 18, the control circuit 73 generates the drive signals Sa, Sb so that the A-phase and B-phase input voltages va, vb are applied at the same frequency to the A-phase and B-phase annular windings 61a, 61b. Furthermore, the control circuit 73 generates the drive signals Sa, Sb such that the MOS transistor Qb is deactivated when the MOS transistor Qa is activated and the MOS transistor Qb is activated when the MOS transistor Qa is deactivated. In other words, the drive signals Sa, Sb are complementary signals.

Thus, the AC power of the two phases, that is, the A-phase input voltage va applied to the A-phase annular winding 61a and the B-phase input voltage vb applied to the B-phase annular winding 61b, are applied to the stator 3 of the two-layer two-phase Lundell-type stator 3.

The operation of the motor M will now be described.

The A-phase input voltage va and the B-phase input voltage vb are applied to the motor M. The A-phase drive circuit unit 71 and the B-phase drive circuit unit 72 respectively include the MOS transistors Qa, Qb. The two-phase power (A-phase input voltage va and B-phase input voltage vb) of the two-layer two-phase multi-Lundell-type motor M is generated with a simple configuration that activates and deactivates the MOS transistors Qa, Qb.

When the A-phase input voltage va is applied to the annular winding 61a of the A-phase stator 3a and the B-phase input voltage vb is applied to the annular winding 61b of the B-phase stator 3b, the rotation magnetic field is generated in the stator 3. This rotates and drives the rotor 2.

The stator 3 is a two-layer structure including the A-phase stator 3a and the B-phase stator 3b corresponding to the A-phase input voltage va and the B-phase input voltage vb, respectively. Accordingly, the rotor 2 also has a two-layer structure including the A-phase rotor 2a and the B-phase rotor 2b. In the stators 3a, 3b and the rotors 2a, 2b, the stators of the two phases facing each other in the axial direction each receive the magnetic flux of the field magnet 30 and increases the output of the motor.

A Lundell-type rotor may have a three-layer structure including stacked rotors respectively corresponding to the U-phase, the V-phase, and the W-phase. Field magnets are provided for the rotors of the U-phase, the V-phase, and the W-phase. In such a case, the field magnets for two phases are magnetized in the same direction, and the field magnet for the remaining phase is magnetized in the opposite direction. In the relationship of the rotors of the U-phase, the V-phase, and the W-phase, the claw poles produce a difference in the magnetic flux between the phases. This greatly disturbs the magnetic balance of the rotor as a whole.

In the present embodiment, the rotor 2 has a two-layer structure including the A-phase rotor 2a and the B-phase rotor 2b. The field magnet 30 of the A-phase rotor 2a and the field magnet 30 of the B-phase rotor 2b are magnetized in opposite directions. Therefore, the disturbance in the magnetic balance of each claw pole 13, 23 between the A-phase rotor 2a and the B-phase rotor 2b is much smaller than a Lundell-type rotor having a three-layer three-phase structure.

Thus, disturbance of the magnetic balance may be reduced in the claw poles 43, 53 of the opposing A-phase stator 3a and the B-phase stator 3b. This improves the motor performance.

Moreover, in the present embodiment, the electric angle θ1 and the electric angle θ2 are set to values based on θ1+|θ2|=90° (electric angle). The electric angle θ1 indicates the shift in the clockwise direction of the B-phase stator 3b from the A-phase stator 3a. The electric angle θ2 indicates the shift in the counterclockwise direction of the B-phase rotor 2b from the A-phase rotor 2a.

In detail, in the stator 3, the B-phase stator 3b is shifted by the predetermined electric angle θ1 (45 degrees) in the clockwise direction from the A-phase stator 3a as viewed from the A-phase motor Ma in the axial direction. In the rotor 2, the B-phase rotor 2b is shifted by the predetermined electric angle θ2 (45 degrees) in the counterclockwise direction from the A-phase rotor 2a as viewed from the A-phase motor Ma in the axial direction.

This allows for avoidance of the dead point, which would disable starting in a two-phase motor, and improves the starting characteristics.

Moreover, the movement amount (rotation amount) of the rotor 2 can be increased with respect to the switching of the first and second stator claw poles 43, 53 resulting from the current flowing to the A-phase and B-phase annular winding 61, 61b of the A-phase and B-phase stators 3a, 3b. This allows the rotation speed of the motor to be increased.

As described above in detail, the third embodiment has the following advantages.

(5) The third embodiment has advantages (1) and (2) of the first embodiment.

(6) In the third embodiment, the A-phase drive circuit unit 71 and the B-phase drive circuit unit 72 respectively include the MOS transistor Qa, Qb. The two-phase power supply of the two-layer two-phase multi-Lundell-type motor M is generated with a simple and inexpensive configuration that activates and deactivates the MOS transistors Qa, Qb.

Fourth Embodiment

A fourth embodiment of the motor M will now be described. The motor M of the present embodiment differs from the third embodiment (i.e., first embodiment) only in the configuration of the annular winding 61 in the coil unit 60 of the A-phase and B-phase stators 3a, 3b. The difference will now be described in detail.

Figure 19:
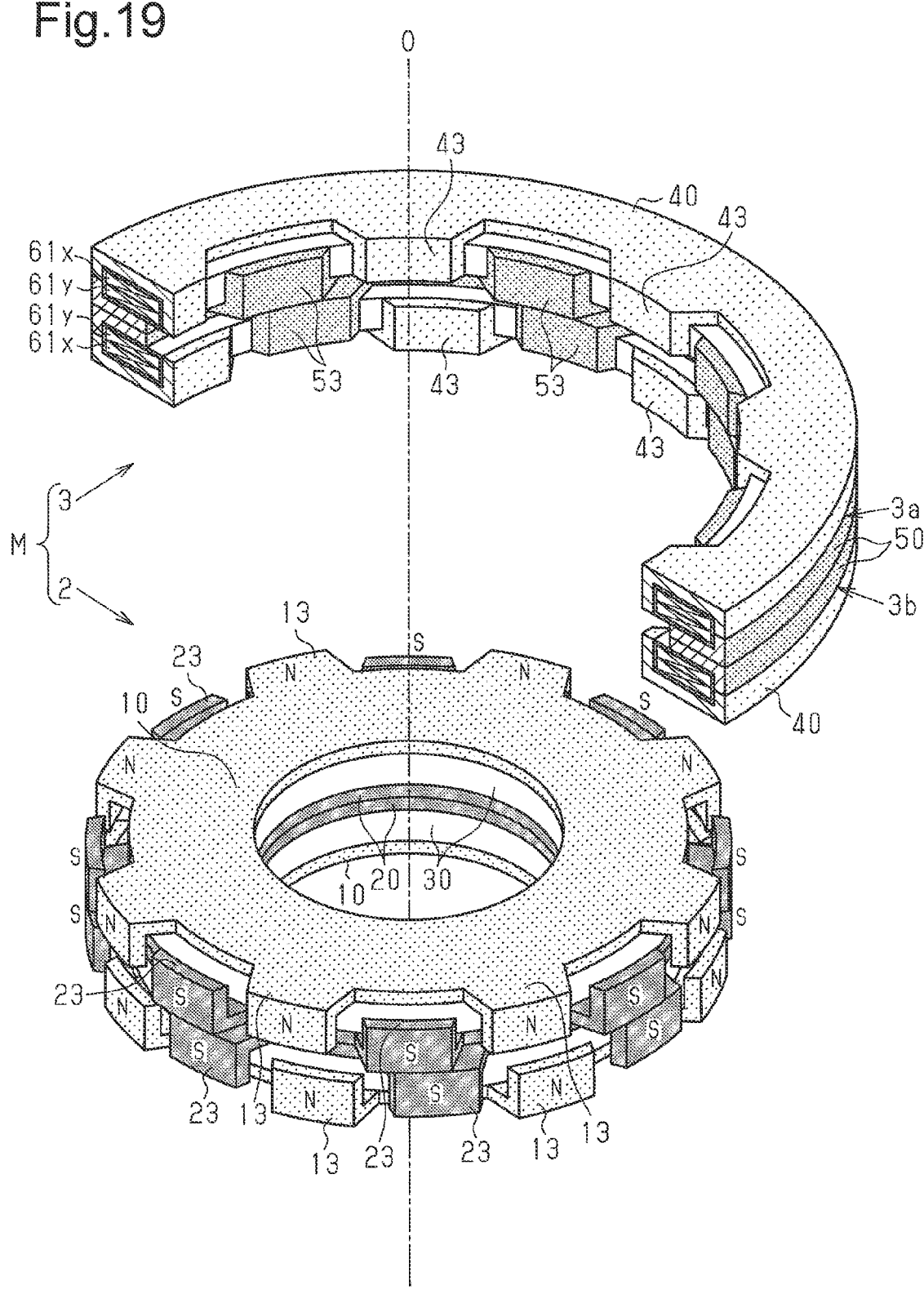
FIG. 19 is an exploded perspective view of a motor in a fourth embodiment in which a stator is partially cut.

As shown in FIG. 19, each of the A-phase and B-phase stator 3a, 3b includes an annular cavity having a square cross-section between the first and second stator core bases 41, 51. The annular cavity accommodates a first system annular winding 61x and a second system annular winding 61y. The first system annular winding 61x and the second system annular winding 61y are covered by the coil insulating layer 62.

In each of the A-phase and B-phase stator 3a, 3b, the first system annular winding 61x and the second system annular winding 61y are stacked in the axial direction. The first system annular winding 61x is arranged closer to the first stator core 40, and the second system annular winding 61y is arranged closer to the second stator core 50.

Figure 20:
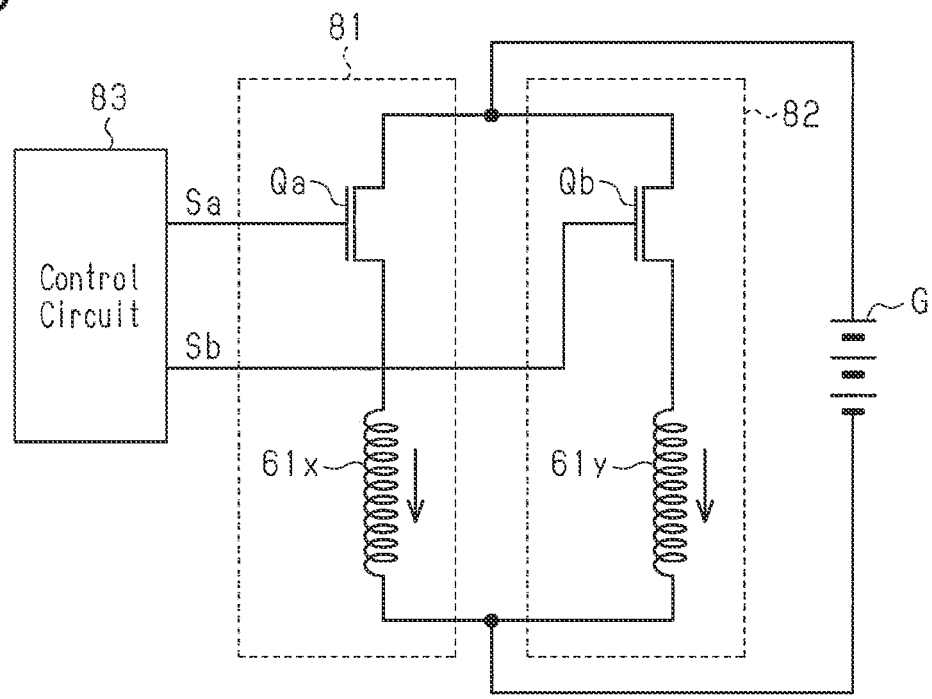
FIG. 20 is a drive control circuit diagram of the motor shown in FIG. 19.

FIG. 20 shows a drive control circuit of the motor M that energizes the first system annular winding 61x and the second system annular winding 61y of each phase. In FIG. 20, reference numeral "61x" entirely represents the A-phase and B-phase first system annular windings 61x that are connected in series, and the reference numeral "61y" entirely represents the A-phase and B-phase second system annular windings 61y that are connected in series.

In the present embodiment, the series-connected A-phase and B-phase first system annular windings 61x and the series-connected A-phase and B-phase second system annular windings 61y are driven and controlled.

Instead, A-phase and B-phase first system annular windings 61x that are connected in parallel and A-phase and B-phase second system annular windings 61y that are connected in parallel may be driven and controlled.

The A-phase first system annular winding 61x and the B-phase first system annular winding 61x may be driven and controlled separately. The A-phase second system annular winding 61y and the B-phase second system annular winding 61y may be driven and controlled separately.

The first system drive circuit unit 81 includes the MOS transistor Qa and the first system annular winding 61x, which is connected in series to the MOS transistor Qa. The series circuit including the MOS transistor Qa and the first system annular winding 61x is connected to the 12-volt DC power supply G. The power supply voltage of the DC power supply G is applied to the first system annular winding 61x by the activation and deactivation (opening and closing) of the MOS transistor Qa.

That is, the power supply voltage (hereinafter referred to as the first system input voltage vx) of the DC power supply G is applied to the first system annular winding 61x by activating the MOS transistor Qa so that current flows in the direction of the arrow shown in FIG. 20. The current flows through the first system annular winding 61x in the clockwise direction as viewed from the A-phase motor Ma in the axial direction.

The first system input voltage vx from the DC power supply G to the first system annular winding 61x is interrupted by activating the MOS transistor Qa so that current does not flow to the first system annular winding 61x.

Therefore, when current flows through the first system annular winding 61x, the current always flows in the direction of the arrow shown in FIG. 20, and the current flows in the clockwise direction as viewed from the A-phase motor Ma in the axial direction.

The second system drive circuit unit 82 includes the MOS transistor Qb and the second system annular winding 61y that are connected in series to the MOS transistor Qb. The series circuit including the MOS transistor Qb and the second system annular winding 61y is connected to the DC power supply G. The power supply voltage of the DC power supply G is applied to the second system annular winding 61y by the activation and deactivation (opening and closing) of the MOS transistor Qb.

That is, the power supply voltage (hereinafter referred to as the second system input voltage vy) of the DC power supply G is applied to the second system annular winding 61y by activating the MOS transistor Qb so that current flows in the direction of the arrow shown in FIG. 20. The current flows through the second system annular winding 61y in the clockwise direction as viewed from the A-phase motor Ma in the axial direction.

The second system input voltage vy from the DC power supply G to the second system annular winding 61y is interrupted by deactivating the MOS transistor Qb so that current does not flow to the second system annular winding 61y.

Therefore, when current flows in the second system annular winding 61y, the current always flows in the direction of the arrow shown in FIG. 20, and the current flows in the clockwise direction as viewed from the A-phase motor Ma in the axial direction.

The control circuit 83 generates the drive signal Sa transmitted to the gate terminal of the MOS transistor Qa of the first system drive circuit unit 81. That is, the control circuit 83 generates the drive signal Sa that activates and deactivates the MOS transistor Qa to energize the first system annular winding 61x in the direction of the arrow shown in FIG. 20.

Figure 21:
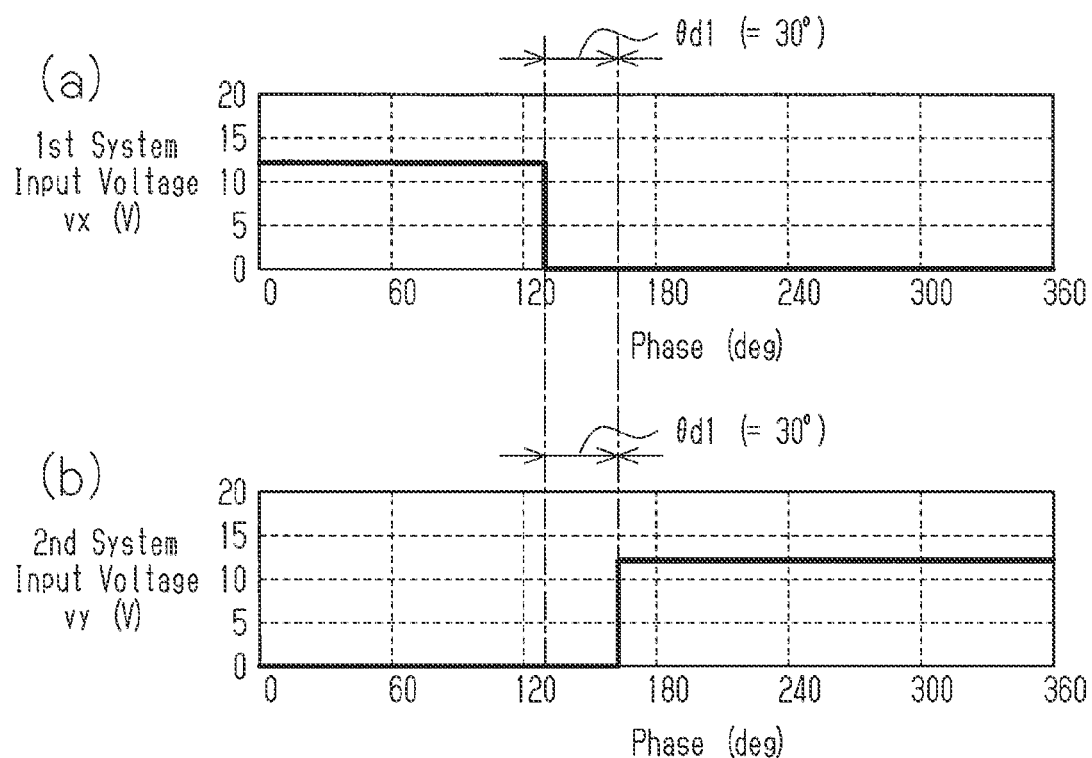
FIG. 21 is a waveform chart showing a first system input voltage supply to a first system annular winding and a second system input voltage supplied to a second system annular winding.

A portion of (a) in FIG. 21 shows the voltage waveform of the first system input voltage vx applied to the first system annular winding 61x. When the MOS transistor Qa is activated and the first system input voltage vx (+12 volts) is applied to the first system annular winding 61x, current flows through the first system annular winding 61x in the clockwise direction as viewed from the A-phase motor Ma in the axial direction.

When the MOS transistor Qa is deactivated and the first system input voltage vx to the first system annular winding 61x is interrupted, current does not flow to the first system annular winding 61x.

The control circuit 83 generates a drive signal Sb transmitted to the gate terminal of the MOS transistor Qb of the second system drive circuit unit 82. That is, the control circuit 83 generates the drive signal Sb that activates and deactivates the MOS transistor Qb so that current flows to the second system annular winding 61y in the direction of the arrow shown in FIG. 20.

A portion of (b) in FIG. 21 shows the voltage waveform of the second system input voltage vy applied to the second system annular winding 61y. When the MOS transistor Qb is activated and the second system input voltage vy (+12 volts) is applied to the second system annular winding 61y, current flows through the second system annular winding 61y in the clockwise direction as viewed from the A-phase motor Ma in the axial direction.

When the MOS transistor Qb is deactivated and the second system input voltage vy to the second system annular winding 61y is interrupted, current does not flow to the second system annular winding 61y.

As shown in FIG. 21, the control circuit 83 generates the drive signals Sa, Sb so that the first and second system input voltages vx, vy are applied at the same frequency to the first and second system annular windings 61x, 61y.

Furthermore, the control circuit 83 controls the first and second system drive circuit units 81, 82 to shift the phase of the second system input voltage vy from the first system input voltage vx.

In detail, as shown FIG. 21, in the present embodiment, the first system input voltage vx falls from +12 volts to 0 volt, and then the second system input voltage vy rises from 0 volts to +12 volts with a delay of a predetermined phase difference θd1.

Therefore, the AC power supplies of two phases are applied to the two-layer two-phase Lundell-type stator 3. More specifically, the first system input voltage vx is applied to the first system annular winding 61x, and the second system input voltage vy is applied to the second system annular winding 61y.

The operation of the fourth embodiment will now be described.

The first system input voltage vx and the second system input voltage vy are applied to the motor M. The MOS transistors Qa, Qb are respectively arranged in the first system drive circuit unit 81 and the second system drive circuit unit 82. The two-phase power supplies (first system input voltage vx and second system input voltage vy) of the two-layer two-phase multi-Lundell-type motor M is generated with a simple configuration that activates and deactivates the MOS transistors Qa, Qb.

When the first system input voltage vx is applied to the first system annular winding 61x of the A-phase and B-phase stators 3a, 3b, and the second system input voltage vy is applied to the second system annular winding 61y of the A-phase and B-phase stators 3a, 3b, the rotation field is generated in the stator 3 to rotate and drive the rotor 2.

As shown in FIG. 21, in the relationship of the first and second system input voltages vx, vy, the first system input voltage vx falls from 12 volts to 0 volt. Then, the second system input voltage vy rises from 0 volts to 12 volts with a delay corresponding to the phase difference θd1.

Figure 22:
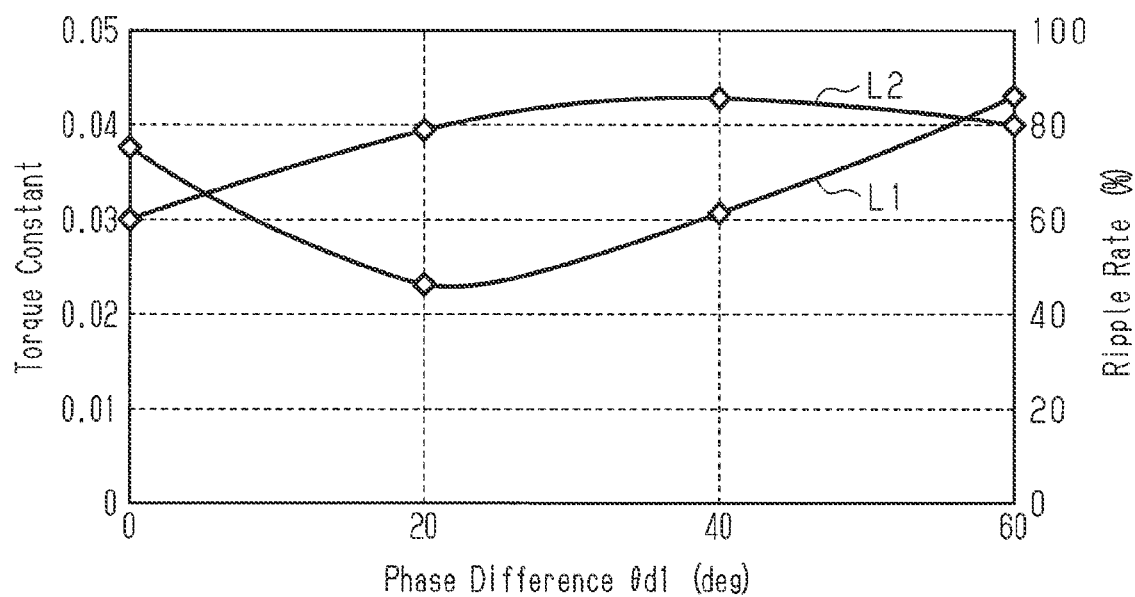
FIG. 22 is a graph showing the torque constant and t ripple rate with respect to a phase difference of the first system input voltage and the second system input voltage.

The phase difference θd1 was changed within 0 degrees to 60 degrees to check the ripple rate and the torque constant of each phase difference θd1. FIG. 22 shows the test results.

Referring to FIG. 22, the ripple rate shown by the characteristic line L1 decreases when the phase difference θd1 is 0 degrees to approximately 20 degrees. The ripple rate increases as the phase difference θd1 exceeds 20 degrees until reaching 60 degrees.

In FIG. 22, the torque constant shown by the characteristic line L2 increases as the phase difference θd1 increases when the phase difference θd1 is 0 degrees to approximately 40 degrees. The torque constant gradually decreases when the phase difference θd1 exceeds 40 degrees.

Thus, the motor M may have low ripple when the phase difference θd1 is set to approximately 20 degrees, and the motor M may have high torque when setting the phase difference θd1 to approximately 40 degrees. Thus, the motor M having the desired motor performance can be realized by setting the phase difference θd1 within a range of 20 degrees to 60 degrees.

As described above in detail, the fourth embodiment has the following advantages in addition to advantages (1) and (2) of the third embodiment (first embodiment).

(7) In the fourth embodiment, the MOS transistors Qa, Qb are respectively arranged in the first system drive circuit unit 81 and the second system drive circuit unit 82. The two-phase power supply of the two-layer two-phase multi-Lundell-type motor M is generated with a simple and inexpensive configuration that activates and deactivates the MOS transistors Qa, Qb.

(8) In the fourth embodiment, the first system input voltage vx falls to 0 volts from 12 volts. Then, the second system input voltage vy rises from 0 volts to 12 volts with a delay corresponding to the phase difference θd1.

Thus, the a M having low ripple is realized by setting the phase difference θd1 to approximately 20 degrees, and a motor M having high torque is realized by setting the phase difference θd1 to approximately 40 degrees. That is, the motor M having the desired motor performance is realized by setting the phase difference θd1 within a range of 20 degrees to 60 degrees.

It should be apparent to those skilled in the art that the present invention may be embodied in many other specific forms without departing from the spirit or scope of the invention. Particularly, it should be understood that the present invention may be embodied in the following forms.

In the first to fourth embodiments, the motor M includes rotors that have the Lundell-type structure and stators that have the Lundell-type structure. The rotors include the A-phase rotor 2a and the B-phase rotor 2b each have sixteen poles. The stators include the A-phase stator 3a and the B-phase stator 3b each having sixteen poles.

Instead, the present invention may be embodied in a motor M in which the A-phase rotor 2a and the B-phase rotor 2b each have an have eight-pole Lundell-type structure and the A-phase stator 3a and the B-phase stator 3b each have an eight-pole Lundell-type structure. Furthermore, the present invention may be applied to a motor having a different number of magnetic poles such as a motor M in which the A-phase rotor 2a and the B-phase rotor 2b each have a twenty-four pole Lundell-type structure and the A-phase stator 3a and the B-phase stator 3b each have a twenty-four pole Lundell-type structure.

In the first to fourth embodiments, the field magnet 30 in each of the A-phase rotor 2a and the B-phase rotor 2b is formed by a ferrite sintered magnet. Instead, for example, the field magnet 30 may be formed by other permanent magnets such as neodymium magnet, a samarium-cobalt magnet, or the like.

Figure 15:
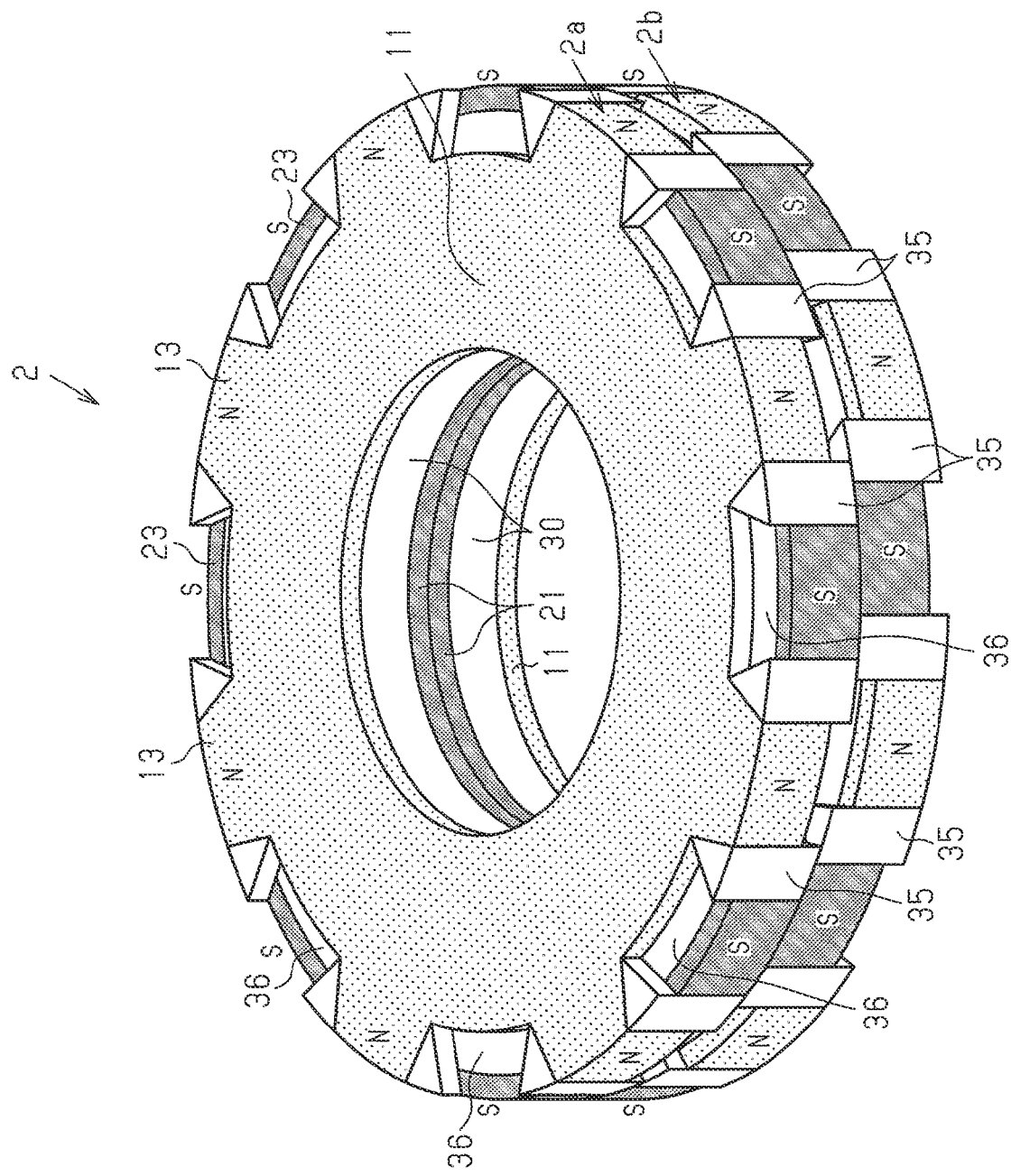
FIG. 15 is a perspective view illustrating another example of the rotor.
Figure 16:
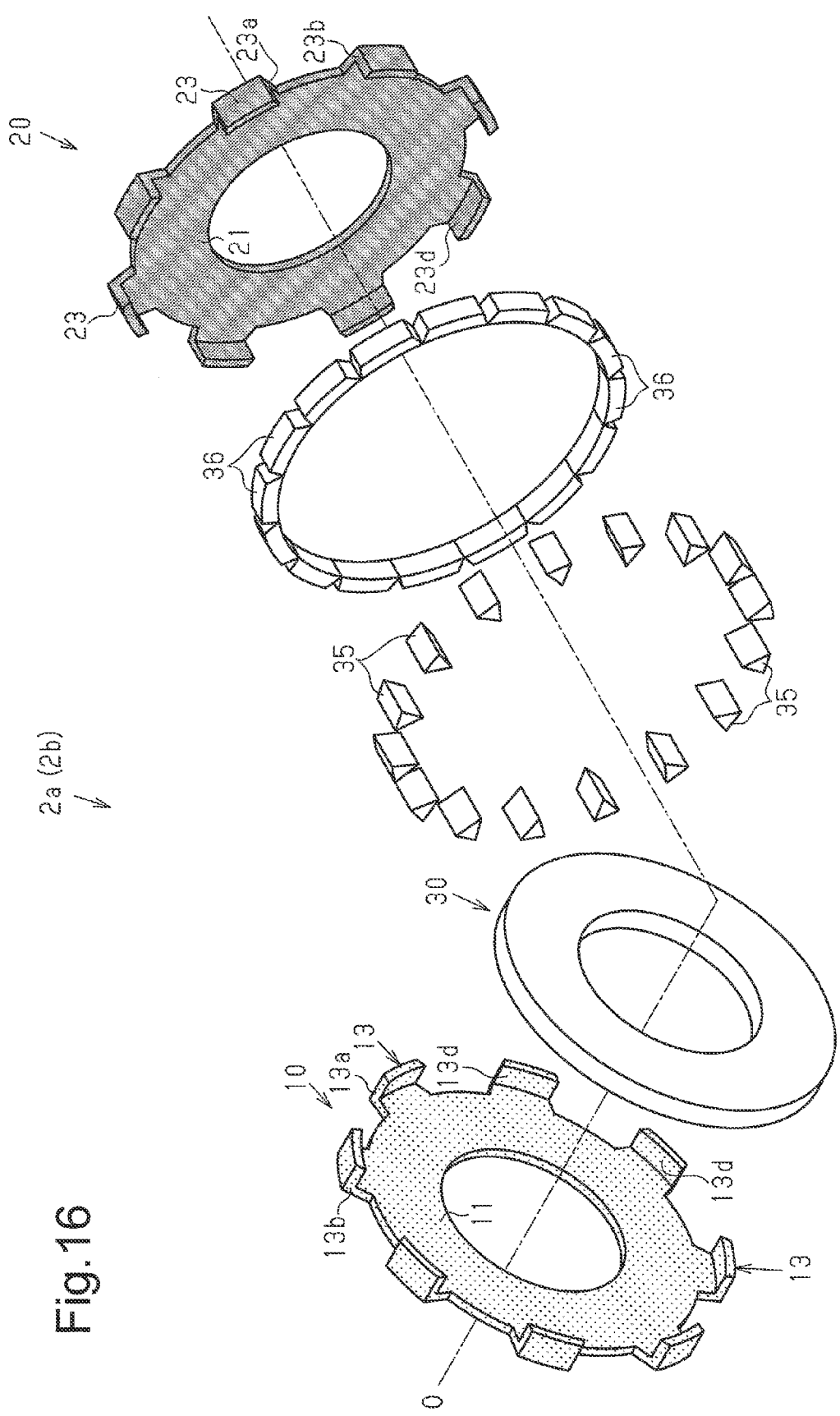
FIG. 16 is an exploded perspective view of an inter-pole auxiliary magnet and a rear auxiliary magnet shown in FIG. 15.

In the first to fourth embodiments, the A-phase rotor 2a and the B-phase rotor 2b of the motor M may be modified to the configuration shown in FIGS. 15 and 16. This configuration includes inter-pole auxiliary magnets 35 and rear auxiliary magnets 36. The inter-pole auxiliary magnets 35 are arranged between the first rotor claw poles 13 and the second rotor claw poles 23 in the circumferential directions. The rear auxiliary magnets 36 are arranged on the radially inner surfaces 13d, 23d of the first and second rotor pole portions 13y, 23y.

Each inter-pole auxiliary magnet 35 is magnetized in the circumferential direction so as to have the same magnetic poles as the adjacent ones of the first and second rotor claw poles 13, 23. Specifically, each inter-pole auxiliary magnet 35 is magnetized so that the portion closer to the first rotor claw pole 13 function as the N pole and the portion closer to the second rotor claw pole 23 functions as the S pole.

Each rear auxiliary magnet 36 on the corresponding first rotor pole portion 13y is magnetized in the radial direction to reduce the leakage magnetic flux at its location. Specifically, the rear auxiliary magnet 36 on the first rotor pole portion 13y is magnetized so that the portion in contact with the radially inner surface 13d of the first rotor claw pole 13 (first rotor pole portion 13y) functions as the N pole, which is the same pole as the first rotor claw pole 13, and the portion in contact with the second rotor core base 21 functions as the S pole, which is the same pole as the second rotor core base 21. Furthermore, each rear auxiliary magnet 36 on the corresponding second rotor pole portion 23y is magnetized in the radial direction to reduce the leakage magnetic flux at its location. Specifically, the rear auxiliary magnet 36 on the second rotor pole portion 23y is magnetized so that the portion in contact with the radially inner surface 23d of the second rotor claw pole 23 (second rotor pole portion 23y) function as the S pole, which is the same pole as the second rotor claw pole 23, and the portion in contact with the first rotor core base 11 functions as the N pole, which is the same pole as the first rotor core base 11.

The rear auxiliary magnets 36 and the inter-pole auxiliary magnets 35 increases the amount of the magnetic flux generated between the rotor claw poles and the stator. This further increases the effective magnetic flux. The output of the motor may thus be increased, and the motor performance may be improved.

The inter-pole auxiliary magnets 35 and the rear auxiliary magnets 36 may be formed by, for example, ferrite sintered magnets like the field magnet 30. Alternatively, the inter-pole auxiliary magnets 35 and the rear auxiliary magnets 36 may be formed by magnets that differ from the field magnet 30 such as neodymium magnets, samarium-cobalt magnets, or the like. The inter-pole auxiliary magnets 35 may be formed by magnets that differ from the magnets forming the rear auxiliary magnets 36.

When the inter-pole auxiliary magnets 35 and the rear auxiliary magnets 36 are formed by permanent magnets of the same material as the field magnet 30, the field magnet 30 may be formed integrally with the inter-pole auxiliary magnets 35 and the rear auxiliary magnets 36.

This facilitates the coupling of the field magnet 30 and the inter-pole auxiliary magnets 35. Further, the separation of the inter-pole auxiliary magnets 35 that may be caused by centrifugal force during rotation is restricted.

In the embodiment described above, the first and second rotor cores 10, 20 and the first and second stator cores 40, 50 are each formed from a single electromagnetic steel plate but may be formed by stacking thin electromagnetic steel plates. Furthermore, the first and second rotor cores 10, 20 and the first and second stator cores 40, 50 may each be formed by a powder magnetic core. This reduces the cost of the motor M.

In the embodiment described above, the annular winding 61 is covered by the coil insulating layer 62, which is formed by a resin molding, in the coil unit 60. Instead, the annular winding 61 may be covered by a cylindrical coil bobbin.

In the third embodiment, the control circuit 73 controls the drive signal so that the B-phase input voltage vb rises to 12 volts when the A-phase input voltage va falls to 0 volt. Instead, the control circuit 73 may control the drive signal so that the B-phase input voltage vb rises to 12 volts with a delay corresponding to a predetermined phase difference after the A-phase input voltage va falls to 0 volts.

The present examples and embodiments are to be considered as illustrative and not restrictive, and the invention is not to be limited to the details given herein, but may be modified within the scope and equivalence of the appended claims.

The invention claimed is:

1. A motor comprising:
a two-layer rotor including an A-phase rotor and a B-phase rotor that are stacked together, wherein
the A-phase rotor includes two A-phase rotor core bases and a field magnet arranged between the A-phase rotor core bases, and each of the A-phase rotor core bases includes claw poles arranged at equal intervals in a circumferential direction, and
the B-phase rotor includes two B-phase rotor core bases and a field magnet arranged between the B-phase rotor core bases, and each of the B-phase rotor core bases includes claw poles arranged at equal intervals in a circumferential direction; and
a two-layer stator including an A-phase stator and a B-phase stator that are stacked together, wherein
the A-phase stator includes two A-phase stator core bases and an A-phase winding arranged between the A-phase stator core bases, and each of the A-phase stator core bases includes claw poles arranged at equal intervals in a circumferential direction, and
the B-phase stator includes two B-phase stator core bases and a B-phase winding arranged between the B-phase stator core bases, and each of the B-phase stator core bases includes claw poles arranged at equal intervals in a circumferential direction;
wherein $\theta1+|\theta2|=90°$ is satisfied, where $\theta1$ represents, in electric angle, an angle of the B-phase stator relative to the A-phase stator in a clockwise circumferential direction, and $\theta2$ represents, in electric angle, an angle of the B-phase rotor relative to the A-phase rotor in a counterclockwise circumferential direction.

2. The motor according to claim 1, wherein
the A-phase winding is wound around the A-phase stator,
the A-phase winding includes a first system annular winding and a second system annular winding,
the B-phase winding is wound around the B-phase stator,
the B-phase winding includes a first system annular winding and a second system annular winding, and
power having different phases are applied to the two first system annular windings and the two second system annular windings.

3. The motor according to claim 1, wherein
the A-phase rotor and the B-phase rotor each further include an auxiliary magnet, and
the auxiliary magnet is arranged in at least one of a location between the field magnet and the claw poles in a radial direction and a location between the adjacent one of the claw poles in the circumferential direction.

4. The motor according to claim 3, wherein the field magnet and the auxiliary magnet form an integrated magnet.

5. A drive controller for the motor according to claim 1, the drive controller comprising:
a DC power supply;
a first switching element that applies power from the DC power supply to the A-phase winding;
a second switching element that applies power from the DC power supply to the B-phase winding; and
a control circuit configured to selectively open and close each of the first switching element and the second switching element to energize the A-phase winding and the B-phase winding from one direction with the DC power supply.

6. The drive controller according to claim 5, wherein
the A-phase winding is connected in series to the first switching element to configure a series circuit,
the B-phase winding is connected in series to the second switching element to configure a series circuit, and
the control circuit is configured to apply power from the DC power supply to the two series circuits.

7. A drive controller for the motor according to claim 1, wherein the A-phase winding includes a first system annular winding and a second system annular winding, and the B-phase winding includes a first system annular winding and a second system annular winding, the drive controller comprising:
a DC power supply;
a first switching element that applies power from the DC power supply to the first system annular winding of the A-phase winding and the first system annular winding of the B-phase winding;
a second switching element that applies power from the DC power supply to the second system annular winding of the A-phase winding and the second system annular winding of the B-phase winding; and
a control circuit configured to selectively open and close each of the first switching element and the second switching element to energize the two first system annular windings and the two second system annular windings from one direction with the DC power supply.

8. The drive controller according to claim 7, wherein
the first system annular winding of the A-phase winding, the first system annular winding of the B-phase winding, and the first switching element are connected in series to configure a series circuit;
the second system annular winding of the A-phase winding, the second system annular winding of the B-phase winding, and the second switching element are connected in series to configure a series circuit; and
the control circuit is configured to apply the DC power supply to the series circuits.

9. The drive controller according to claim 7, wherein the control circuit is configured to selectively open and close each of the first switching element and the second switching element to energize the two first system annular windings and the two second system annular windings in different phases.

10. The drive controller according to claim 9, wherein the different phases of energizing has a phase difference from 20 degrees to 60 degrees.

11. A method for driving a motor, wherein the motor includes:
a two-layer rotor including an A-phase rotor and a B-phase rotor that are stacked together, wherein
the A-phase rotor includes two A-phase rotor core bases and a field magnet arranged between the A-phase rotor core bases, and each of the A-phase rotor core bases includes claw poles arranged at equal intervals in a circumferential direction, and
the B-phase rotor includes two B-phase rotor core bases and a field magnet arranged between the B-phase rotor core bases, and each of the B-phase rotor core bases includes claw poles arranged at equal intervals in a circumferential direction; and
a two-layer stator including an A-phase stator and a B-phase stator that are stacked together, wherein
the A-phase stator includes two A-phase stator core bases and an A-phase winding arranged between the A-phase stator core bases, and each of the A-phase stator core bases includes claw poles arranged at equal intervals in a circumferential direction, and
the B-phase stator includes two B-phase stator core bases and a B-phase winding arranged between the B-phase stator core bases, and each of the B-phase stator core bases includes claw poles arranged at equal intervals in a circumferential direction;
the method comprising applying power to the A-phase winding and the B-phase winding in different phases.

12. The method according to claim 11, wherein the power applied to the A-phase winding and the power applied to the B-phase winding have a phase difference of 75 degrees to 90 degrees.

13. The method according to claim 11, further comprising arranging the two-layer rotor and the two-layer stator to satisfy $\theta1+|\theta2|=90°$, where $\theta1$ represents, in electric angle, an angle of the B-phase stator relative to the A-phase stator in a clockwise circumferential direction, and $\theta2$ represents, in electric angle, an angle of the B-phase rotor relative to the A-phase rotor in a counterclockwise circumferential direction.

14. A method for driving a motor, wherein the motor includes:
a two-layer rotor including an A-phase rotor and a B-phase rotor that are stacked together, wherein
the A-phase rotor includes two A-phase rotor core bases and a field magnet arranged between the A-phase rotor core bases, and each of the A-phase rotor core bases includes claw poles arranged at equal intervals in a circumferential direction, and
the B-phase rotor includes two B-phase rotor core bases and a field magnet arranged between the B-phase rotor core bases, and each of the B-phase rotor core bases includes claw poles arranged at equal intervals in a circumferential direction; and
a two-layer stator including an A-phase stator and a B-phase stator that are stacked together, wherein
the A-phase stator includes two A-phase stator core bases and an A-phase winding arranged between the A-phase stator core bases, and each of the A-phase stator core bases includes claw poles arranged at equal intervals in a circumferential direction, and
the B-phase stator includes two B-phase stator core bases and a B-phase winding arranged between the B-phase stator core bases, and each of the B-phase stator core bases includes claw poles arranged at equal intervals in a circumferential direction;
wherein
the A-phase winding is wound around the A-phase stator,
the A-phase winding includes a first system annular winding and a second system annular winding, the B-phase winding is wound around the B-phase stator, and the B-phase winding includes a first system annular winding and a second system annular winding;

the method comprising:

applying power to the two first system annular windings and the two second system annular windings in different phases.

16. The method according to claim 14, wherein the power applied to the first system annular winding and the power applied to the second system annular winding have a phase difference of 10 degrees to 40 degrees.

16. The method according to claim 14, further comprising arranging the two-layer rotor and the two-layer stator to satisfy $\theta1+|\theta2|=90°$, where $\theta1$ represents, in electric angle, an angle of the B-phase stator relative to the A-phase stator in a clockwise circumferential direction, and $\theta2$ represents, in electric angle, an angle of the B-phase rotor relative to the A-phase rotor in a counterclockwise circumferential direction.

* * * * *